(12) United States Patent
Satta et al.

(10) Patent No.: US 7,594,699 B2
(45) Date of Patent: Sep. 29, 2009

(54) SEAT APPARATUS

(75) Inventors: Hirota Satta, Ichinomiya (JP); Hidemitsu Higashi, Kariya (JP); Masaya Mizuguchi, Chiryu (JP); Hideharu Kato, Toyota (JP); Tomonori Suzuki, Seto (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 129 days.

(21) Appl. No.: 11/510,769

(22) Filed: Aug. 28, 2006

(65) Prior Publication Data

US 2007/0046088 A1 Mar. 1, 2007

(30) Foreign Application Priority Data

Aug. 30, 2005 (JP) ............................. 2005-249682

(51) Int. Cl.
*B60N 2/20* (2006.01)
*B60N 2/02* (2006.01)

(52) U.S. Cl. .............................. 297/362.11; 297/378.1; 297/361.1

(58) Field of Classification Search .............. 297/361.1, 297/378.1, 217.3, 362.11, 125; 296/65.16, 296/65.17, 68, 69
See application file for complete search history.

(56) References Cited

U.S. PATENT DOCUMENTS

| 4,669,780 A | * | 6/1987 | Sakakibara et al. ......... 297/257 |
| 5,507,554 A | * | 4/1996 | Nakano et al. .......... 297/216.13 |
| 7,053,575 B2 | * | 5/2006 | Fukuhara et al. ............. 318/538 |
| 7,156,442 B2 | * | 1/2007 | McManus et al. ......... 296/65.09 |
| 2001/0040400 A1 | | 11/2001 | Kamida et al. |
| 2003/0184112 A1 | * | 10/2003 | Furui ....................... 296/65.01 |
| 2004/0140783 A1 | * | 7/2004 | Fukuhara et al. ............. 318/467 |
| 2004/0195892 A1 | * | 10/2004 | Daniels ................... 297/378.1 |
| 2005/0017564 A1 | * | 1/2005 | Kayumi ................... 297/378.1 |
| 2005/0168035 A1 | * | 8/2005 | Boudinot ................. 297/378.1 |
| 2005/0236881 A1 | | 10/2005 | Suda et al. |

FOREIGN PATENT DOCUMENTS

| JP | 10-287160 | 10/1998 |
| JP | 2001-322461 | 11/2001 |
| JP | 2004-106640 | 4/2004 |
| JP | 2004-249964 | 9/2004 |

* cited by examiner

*Primary Examiner*—David Dunn
*Assistant Examiner*—Tania Abraham
(74) *Attorney, Agent, or Firm*—Buchanan Ingersoll & Rooney PC

(57) ABSTRACT

A seat apparatus includes a seat cushion on which an operator is seated, a seatback supporting the operator seated on the seat cushion, the seatback being configured to incline forward to reduce an angle of the seatback relative to the seat cushion and to incline rearward to increase the angle of the seatback relative to the seat cushion, a seatback drive device inclining the seatback forward and rearward relative to the seat cushion, a seatback operating switch provided at a position where is reached by the operator seated on the seat cushion, the seatback operating switch operating the seatback driving device in response to an operation of the switch, and an excessive load restricting device restricting an excessive load applied to the operator seated on the seat cushion by limiting a forward inclination of the seatback when the seatback operating switch is operated so as to incline the seatback forward.

4 Claims, 31 Drawing Sheets

Seat cushion position - speed

Seat cushion position − speed

Seatback position − speed

Seat cushion position – speed

Seatback position – speed

Seatback position - speed

Seat cushion position - speed

Seatback position - speed

Seat cushion position - speed

Seatback position - speed

US 7,594,699 B2

SEAT APPARATUS

This application is based on and claims priority under 35 U.S.C. § 119 to Japanese Patent Application 2005-249682, filed on Aug. 30, 2005, the entire content of which is incorporated herein by reference.

FIELD OF THE INVENTION

The present invention relates to a seat apparatus including a seat cushion on which an operator is seated and a seatback for supporting a back of the operator.

BACKGROUND

A seat apparatus mounted to a vehicle will be explained hereinafter as an example. Conventionally, seat apparatuses are known which include a seat cushion on which an operator is seated, a seatback for supporting a back of the operator, and a drive device changing a position of the seat cushion and the seatback between a seating position and a storage position. Known seat apparatuses of this type are disclosed in JP2004-106640A and JP2004-249964A.

Further, a known seat apparatus is disclosed in JP2001-322461A, which can change a state of the seat apparatus among a forward seating state, a flat state, a rearward seating state, and a storage state. According to the seat apparatus disclosed in JP2001-322461A, a seatback can be used as a table by inclining the seatback forward. Moreover, a known seat apparatus is disclosed in H10-287160A, a front seat and a backseat of which function as a table by inclining a seatback of the front seat rearward in a condition where a seatback of the backseat is inclined forward so that the seatback of the backseat is overlapped with a seat cushion of the backseat.

According to the disclosed seat apparatuses, if the seatback inclines forward in a condition where the operator is seated on the seat cushion, the operator may be applied with an excessive load because of a pressure of the seatback. In particular with the seat apparatus having a table function, because the seatback inclines forward so that the seatback comes in a substantial horizontal state to overlap with the seat cushion, the operator seated on the seat cushion may be applied with the excessive load because of the pressure of the seatback.

The present invention has been made in view of the above circumstances, and provides a seat apparatus, which prevents an application of an excessive load from a seatback relative to an operator seated on a seat cushion.

SUMMARY OF THE INVENTION

According to an aspect of the present invention, a seat apparatus includes a seat cushion on which an operator is seated, a seatback supporting the operator seated on the seat cushion, the seatback being configured to incline forward to reduce an angle of the seatback relative to the seat cushion and to incline rearward to increase the angle of the seatback relative to the seat cushion, a seatback drive device inclining the seatback forward and rearward relative to the seat cushion, a seatback operating switch provided at a position where is reached by the operator seated on the seat cushion, the seatback operating switch operating the seatback driving device in response to an operation of the switch, and an excessive load restricting device restricting an excessive load applied to the operator seated on the seat cushion by limiting a forward inclination of the seatback when the seatback operating switch is operated so as to incline the seatback forward.

According to another aspect of the present invention, a seat apparatus includes a seat cushion on which an operator is seated, a seatback supporting the operator seated on the seat cushion, the seatback being configured to incline forward to reduce an angle of the seatback relative to the seat cushion and to incline rearward to increase the angle of the seatback relative to the seat cushion, a seatback drive device inclining the seatback forward and rearward relative to the seat cushion, a seatback operating switch provided at a position where the seatback operating switch can be operated by the operator seated on the seat cushion, the seatback operating switch operating the seatback drive device in response to an operation of the switch, and a control unit controlling the seatback drive device by operating the seatback operating switch, the control unit including a range determining device determining if a present position of the seatback is within an excessive load restricting range in which an application of an excessive load to the operator seated on the seat cushion is restricted by limiting the angle of the seatback and a seatback inclination restricting device restricting a forward inclination of the seatback by limiting a driving of the seatback drive device regardless of the operation of the seatback operating switch when the range determining means determines that the present position of the seatback is within the excessive load restricting range.

BRIEF DESCRIPTION OF THE DRAWINGS

The foregoing and additional features and characteristics of the present invention will become more apparent from the following detailed description considered with reference to the accompanying drawings, wherein:

FIG. 18 is a flow chart illustrating a storing operation speed control a;

FIG. 19 is a graph indicating a relation between operating speed VCb and VCa of a seat cushion and a position of the seat cushion in the storing operation speed control a;

FIG. 26 is a flow chart illustrating a returning operation speed control a;

FIG. 27 is a graph indicating a relation between operating speed VBb and VBa of the seatback and a position of the seatback in the returning operation speed control a;

DETAILED DESCRIPTION

Figure 1:
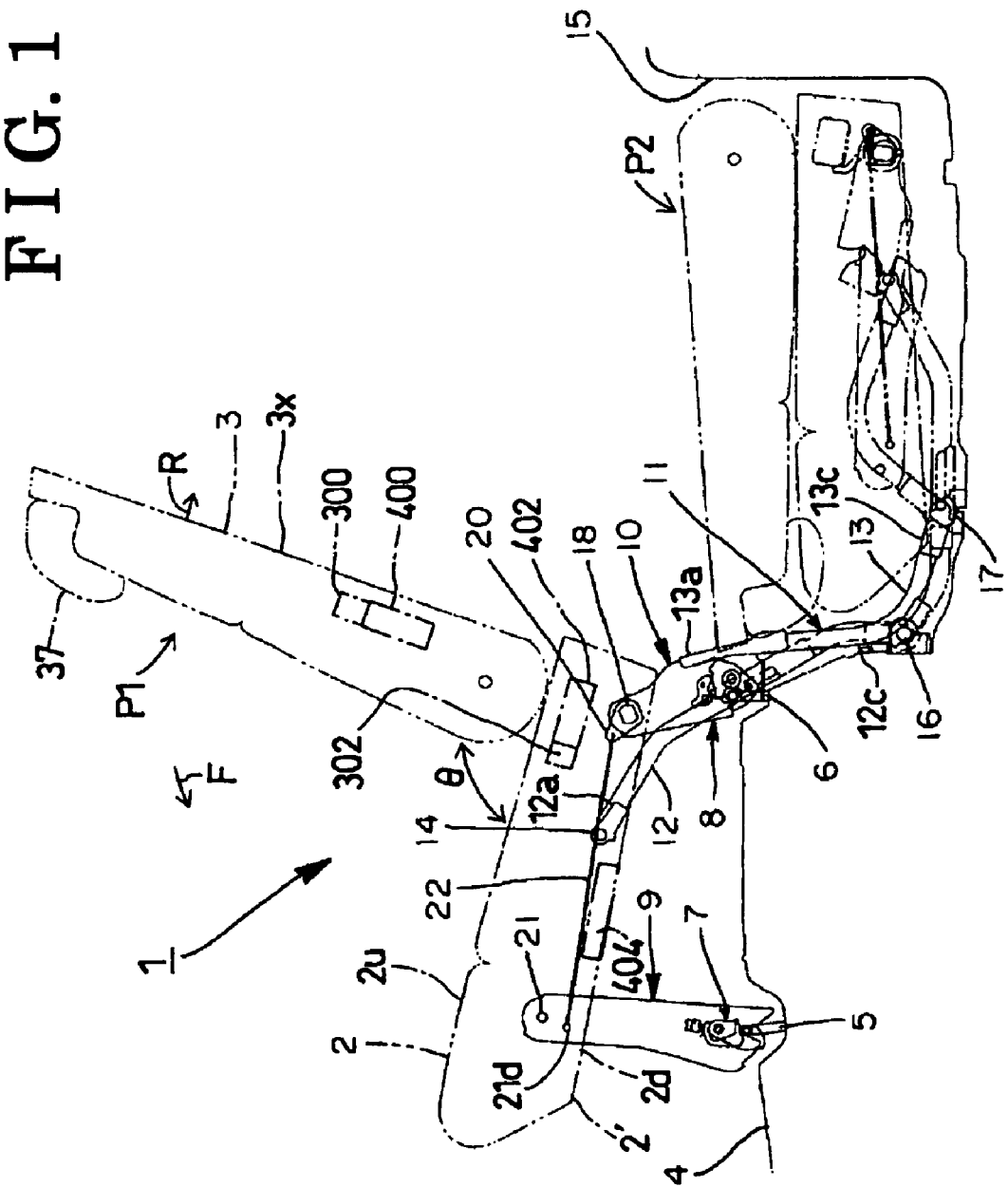
FIG. 1 is a schematic view illustrating a seat apparatus.
Figure 2:
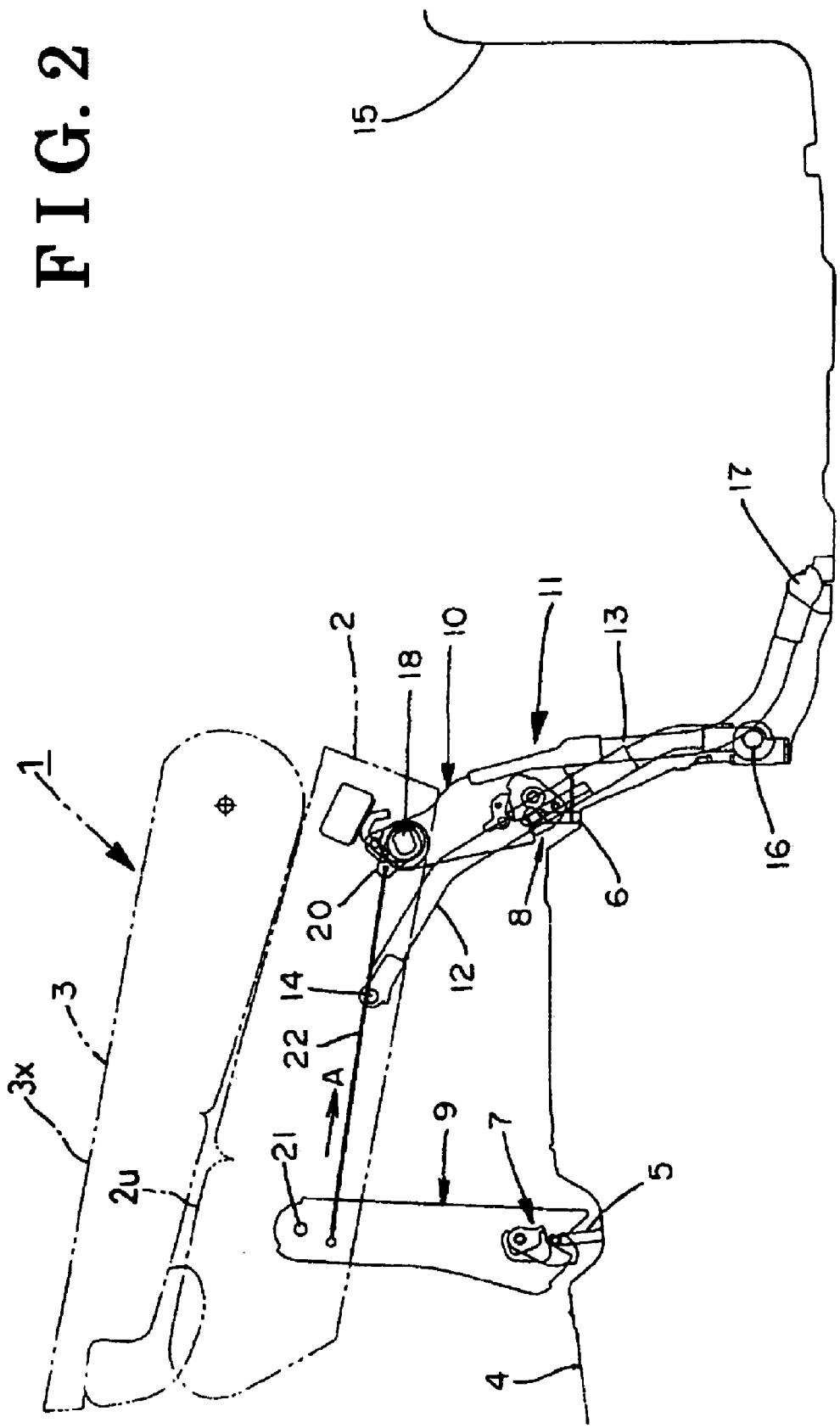
FIG. 2 is a schematic view illustrating the seat apparatus operated in the vicinity of a seating position.
Figure 3:
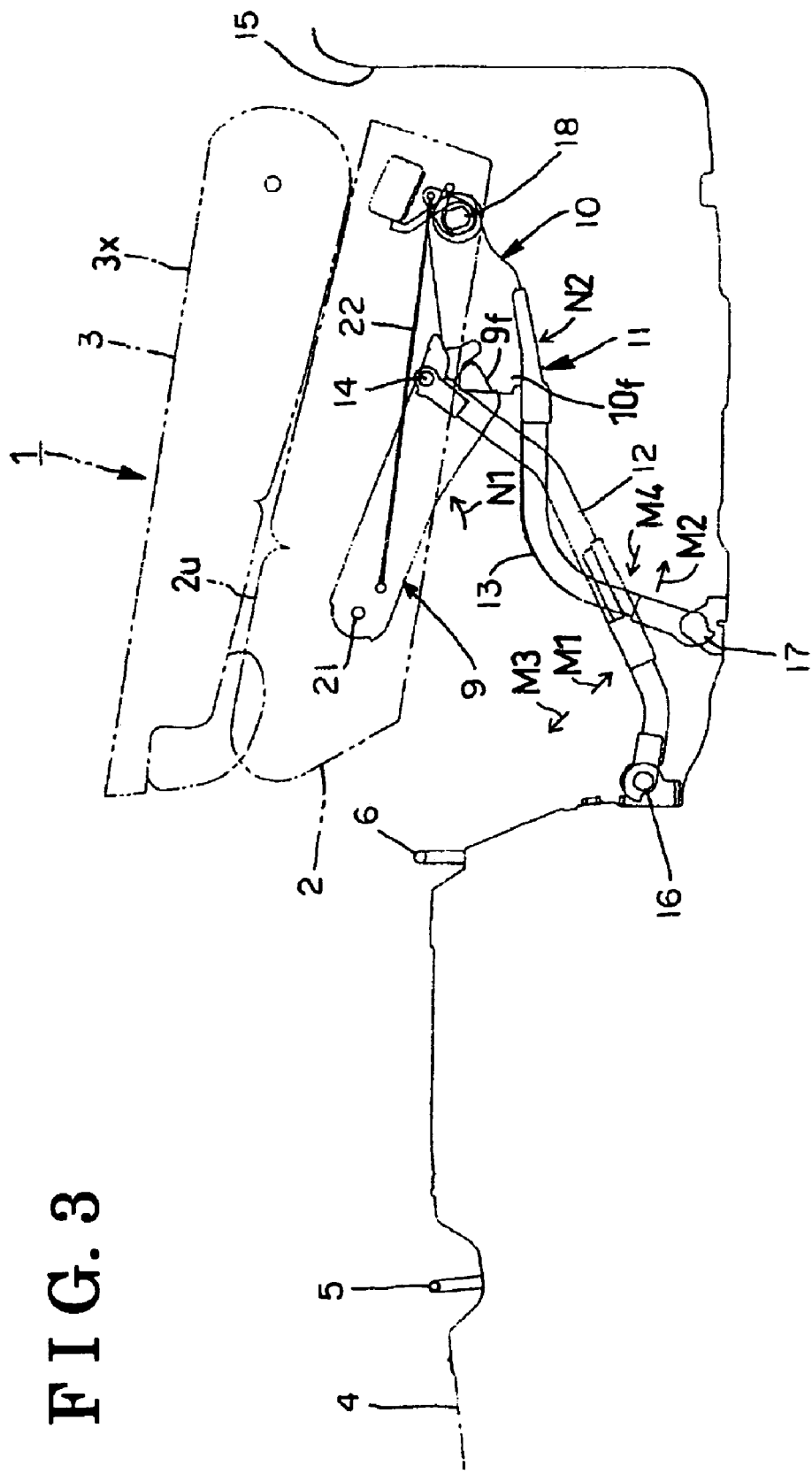
FIG. 3 is a schematic view illustrating the seat apparatus operated in the vicinity of a storage position.
Figure 4:
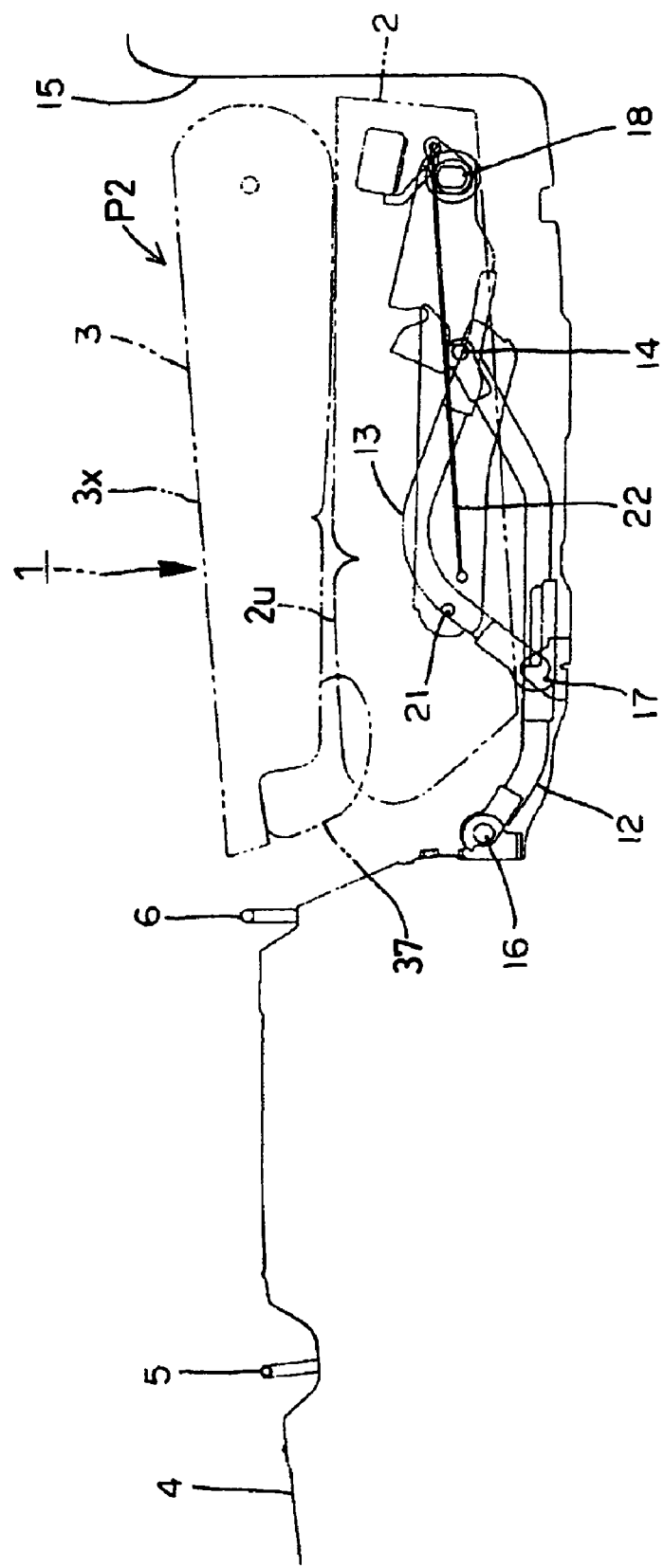
FIG. 4 is a schematic view illustrating the seat apparatus stored in the storage position.

An embodiment of the present invention applied to a seat apparatus provided in a vehicle will be explained in detail with reference to the attached drawings. With reference to FIGS. 1-4, the embodiment of the present invention is mechanically explained. As illustrated in FIG. 1, a seat apparatus 1 is provided as a seat of a vehicle floor 4 (base body). The seat apparatus 1 includes a seat cushion 2 on which a operator is seated and a seatback 3 for supporting a back of the operator. The seatback 3 is rotatable relative to the seat cushion 2. A position of the seat apparatus 1 can be changed between a seating position P1 placed at a relatively front side of the floor 4 and a storage position P2 placed at a relatively rear side of the floor 4. As illustrated in FIG. 1, at the seating position P1, the seat cushion 2 of the seat apparatus 1 is locked by means of locking devices 7 and 8 and the seatback 3 is generally set at a stand angle θ relative to the seat cushion 2. As illustrated in FIG. 4, at the storage position P2, the seat cushion 2 and the seatback 3 of the seat apparatus 1 are stored in a recess portion 15 in such a manner that the seat cushion 2 and the seatback 3 of the seat apparatus 1 are overlapped with each other. The recess portion 15 is formed at the vehicle floor 4 in such a manner to be opened upward and is placed posterior to the seating position P1. The storage position P2 is provided on the vehicle floor 4 at a rear side relative to the seating position P1 in a back and forth direction of the vehicle. A front striker 5 (a fixed side engaging member) and a rear striker 6 (a fixed side engaging member) are fixed to the vehicle floor 4 at the seating position P1. A headrest 37 is provided on a top portion of the seatback 3. The seat cushion 2 includes a frame 2' which is slidable in the back and forth direction of the vehicle, i.e., in a position adjusting direction.

The seat cushion 2 further includes a front leg 9 serving as a first engaging member and a rear leg 10 serving as a second engaging member and the seat cushion 2 is supported at the vehicle floor 4 by means of the front leg 9 and the rear leg 10. The front leg 9 is provided with the locking device 7 engageable with the striker 5 of the vehicle floor 4. The rear leg 10 is provided with the locking device 8 engageable with the striker 6 of the vehicle floor 4. The front leg 9 is pivotally supported at the frame 2' of the seat cushion 2 through a pivot point 21.

A supporter 11 for supporting the seat cushion 2 is configured of four link devices (i.e., a moving mechanism) which moves the seat cushion 2. More specifically, the link devices include a first link pair 12 and a second link pair 13 provided at the seat cushion 2 at right and left sides thereof (both sides in a width direction of the vehicle). The link devices move the seat cushion 2 between the seating position P1 and the storage position P2 in such a manner that an upper surface 2u of the seat cushion 2 remains at an upper side and a downside surface 2d of the seat cushion 2 remains at a lower side without vertically flipping the seat cushion 2. Because the seat apparatus according to the embodiment of the present invention does not adopt a system of turning over the seat cushion centering about an end portion of the seat cushion, an excessively falling of objects placed on the seat apparatus 1 can be restricted. Further, a lock between the seat cushion 2 and the seatback 3 during a movement thereof is not required and an increase in a turning radius of the seat cushion can be restricted. A first end portion 12a of the first link 12 is pivotally supported at a pivot point 14 of the frame 2' of the seat cushion 2. A second end portion 12c of the first link 12 is pivotally supported at a pivot point 16 in the recess portion 15. A first end portion 13a of the second link 13 is fixed to the rear leg 10. A second end portion 13c of the second link 13 is pivotally supported at a pivot point 17 in the recess portion 15. The pivot point 16 and the pivot point 17 are placed away from each other. A horizontal type shaft 18 is provided at the frame 2' for swingably supporting the rear leg 10 relative to the frame 2' of the seat cushion 2. A bracket 20 is fixed to the shaft 18. A connect portion 21d placed below the pivot point 21 of the front leg 9 and the bracket 20 of the shaft 18 are connected by means of a cable 22.

As illustrated in FIG. 1, a seat cushion motor 402 (i.e., a seat cushion actuator, a seat cushion drive device) is provided at the frame 2' of the seat cushion 2. The seat cushion motor 402 is a driving source of a storing operation and a returning operation of the seat cushion 2 for moving the seat cushion 2 between the seating position P1 and the storage position P2. An unlock motor 404 (i.e., an unlock actuator) for unlocking the locking devices 7 and 8 is provided at the frame 2'. A seatback motor 400 (i.e., a seatback actuator, a seatback drive device) is provided at an inside of the seatback 3. The seatback motor 400 is a driving source of a storing operation and a returning operation of the seatback 3 for inclining the seatback 3 forward (a direction of an arrow F in FIG. 1) and backward (a direction of an arrow R in FIG. 1). In the storing operation of the seatback 3, the stand angle of the seatback 3 relative to the seat cushion 2 is reduced. In the returning operation of the seatback 3, the stand angle of the seatback 3 relative to the seat cushion 2 is increased.

Figure 6:
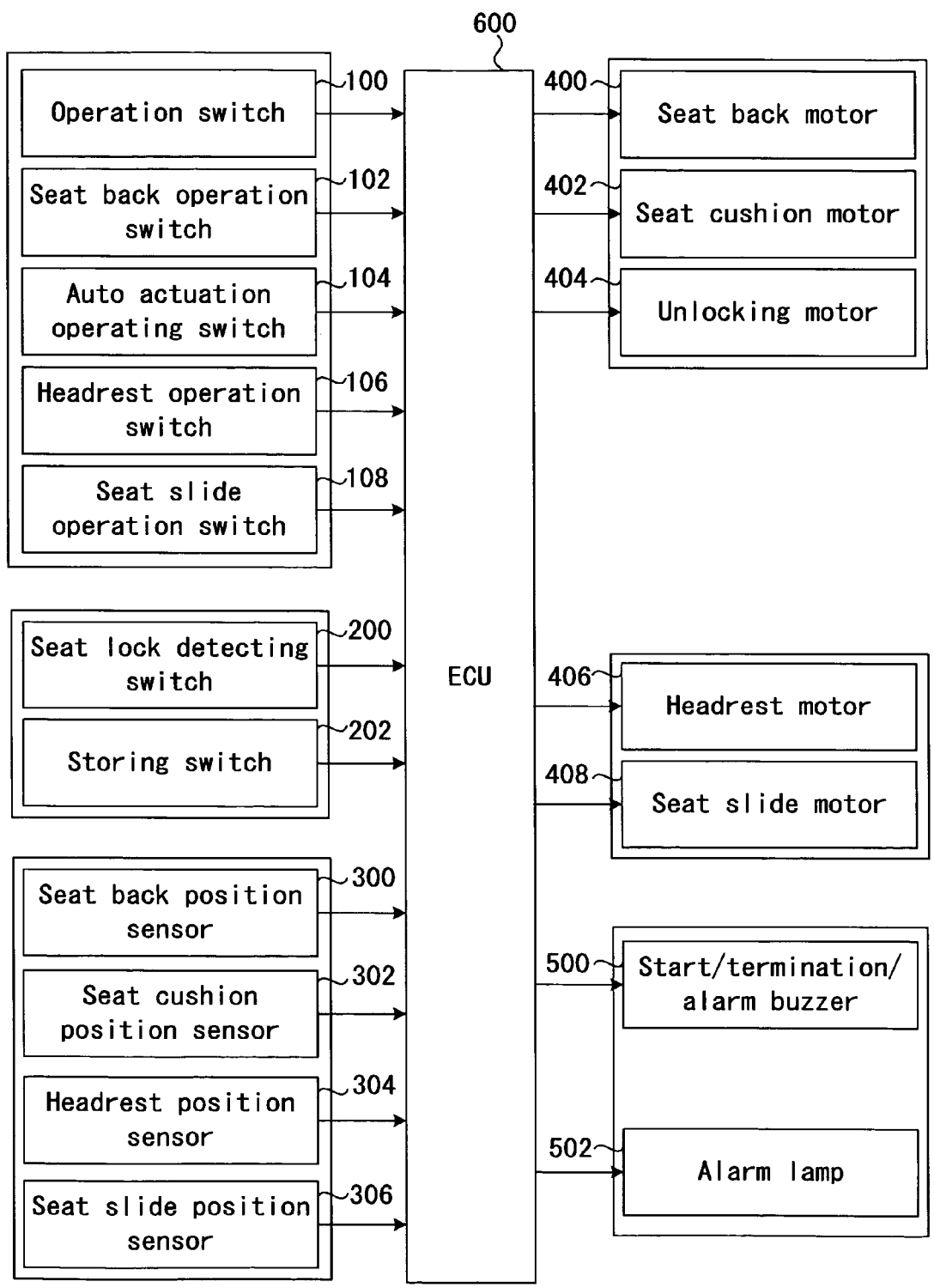
FIG. 6 is a block diagram of a control system.

Illustrated in FIG. 6 is a block diagram of a control system. An operating switch 100 (i.e., an operating portion) is manually operated by the operator and outputs a storing operation command signal and a returning operation command signal for moving the seat apparatus 1 between the seating position P1 and the storage position P2. The operating switch 100 changes the position of the seat apparatus 1 between the seating position P1 and the storage position P2 by driving the seat cushion motor 402 and the seatback motor 400. When the manual operation of the operating switch 100 is continued, the driving of the seatback motor 400 and the seat cushion motor 402 are continued and a position of the seat apparatus 1 is changed between the seating position P1 and the storage position P2. If the manual operation of the operating switch 100 is interrupted, the driving of the seatback motor 400 and the seat cushion motor 402 is stopped and the seat apparatus 1 is stopped at the present position. According to the embodiment of the present invention, the operating switch 100 is provided at a back door 700 side of the vehicle. However, the present invention is not limited thereto and the operating switch 100 may be provided at other parts of the vehicle.

Figure 5:
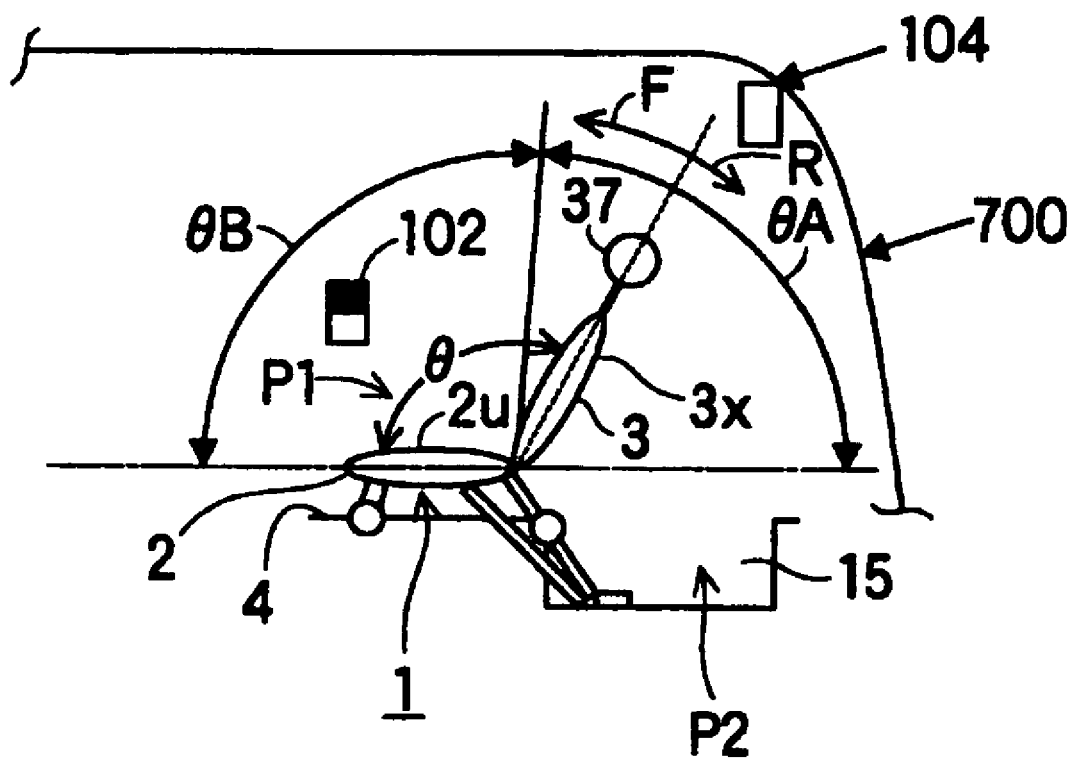
FIG. 5 is a schematic view illustrating the seat apparatus in a vehicle compartment.

A seatback operating switch 102 is provided for a reclining operation of the seatback 3. According to the embodiment of the present invention, as illustrated in FIG. 5, the seatback operating switch 102 is provided in the vicinity of the seat apparatus 1 so that the operator seated on the seat apparatus 1 can operate the seatback operating switch 102. However, the present invention is not limited thereto and the seatback operating switch 102 may be provided at other part of the vehicle. According to the embodiment of the present invention, when the operator seated on the seat apparatus 1 operates the seatback operating switch 102, the seatback 3 can be inclined only within a fine adjustable range θA (i.e., a reclining range). More specifically, a fine adjustment prohibited range θB is set for limiting a forward inclination (i.e., an inclination in the direction of the arrow F in FIG. 1) of the seatback 3 when the operator seated on the seat apparatus 1 operates the seatback operating switch 102. Accordingly, when the operator seated on the seat apparatus 1 operates the seatback operating switch 102, the inclination of the seatback 3 into the fine adjustment prohibited range θB is prohibited for preventing the operator from being applied with an excessive load by the seatback 3. In this regard, however, the operating switch 100 and an automatic operating switch 104 can operate the seatback 3 and the seat cushion 2 to overlap with each other. The automatic operating switch 104 inclines the seatback 3 of the seat apparatus 1 forward (the direction of the arrow F in FIG. 1) and backward (the direction of the arrow R in FIG. 1) by driving the seatback motor 400. According to the embodiment of the present invention, as illustrated in FIG. 5, the automatic operating switch 104 is provided in the vicinity of the back door 700 of the vehicle.

A headrest operating switch 106 moves the headrest 37 between a headrest using position and a headrest storage position by driving a headrest motor 406 (i.e., a headrest actuator, a third drive device). A seat slide operating switch 108 adjusts a position of the frame 2' of the seat cushion 2 in the back and forth direction of the vehicle (a slide direction) by driving a seat slide motor 408 (i.e., a seat slide actuator, a fourth drive device). The seat slide motor 408 moves the cushion frame 2' of the seat cushion 2 along the slide direction (the back and forth direction of the vehicle). A seat lock detecting switch 200 provided at the seat cushion 2 in the vicinity of the locking device 7 detects if the seat cushion 2 is placed at the seating position P1 of the vehicle floor 4 and is locked by means of the locking devices 7 and 8. A storage switch 202 provided at the storage position P2 of the floor 4 detects if the seat cushion 2 is stored at the storage position P2 of the floor 4.

A seatback position sensor 300 (i.e., a physical quantity detecting means) detects an inclined position of the seatback 3. More specifically, the seatback position sensor 300 detects the position of the seatback 3 by detecting, for example, a driving amount of the seatback motor 400 on the basis of a pulse number due to magnetism or light caused by a rotation of the motor 400. A seat cushion position sensor 302 (the physical quantity detecting means) detects a position of the seat cushion 2. More specifically, the seat cushion position sensor 302 detects the position of the seat cushion 2 by detecting, for example, a driving amount of the seat cushion motor 402 on the basis of a pulse number due to magnetism or light caused by a rotation of the motor 402. A seat slide position sensor 306 (the physical quantity detecting means) detects a slide position of the frame 2' of the seat cushion 2 in the back and forth direction of the vehicle (the slide direction). More specifically, the seat slide position sensor 306 detects the slide position of the frame 2' of the seat cushion 2 by detecting, for example, a driving amount of the seat slide motor 408 on the basis of a pulse number due to magnetism or light caused by a rotation of the motor 408. A headrest position sensor 304 (the physical quantity detecting means) detects a position of the headrest 37. More specifically, the headrest position sensor 304 detects the position of the headrest 37 by detecting, for example, a driving amount of the headrest motor 406 on the basis of a pulse number due to magnetism or light caused by a rotation of the motor 406. Signals received from each switch and each sensor are entered into an ECU 600 (i.e., a control unit). The ECU 600 includes an input processing circuit, a CPU, a memory, and an output processing circuit. The seatback motor 400, the seat cushion motor 402, the unlock motor 404, the headrest motor 406, the seat slide motor 408, an alarm buzzer 500, and an alarm lamp 502 are controlled by means of a control signal from the ECU 600.

The storing operation of the seat apparatus 1 from the seating position P1 to the storage position P2 according to the embodiment of the present invention will be explained. When the operating switch 100 is manually operated by the operator in a storing direction, the seatback motor 400 is driven, the seatback 3 is inclined forward (the direction of the arrow F in FIG. 1), the stand angle of the seatback 3 is reduced, and the storing operation of the seatback 3 is performed. In consequence, as illustrated in FIG. 2, the seat cushion 2 and the seatback 3 locked by means of the locking devices 7 and 8 are overlapped with each other. On this occasion, the seat cushion 2 is placed at the lower side and the seatback 3 is placed at the upper side. Then, when the unlock motor 404 is driven, the lock of the locking devices 7 and 8 are unlocked and the seat cushion 2 comes into a state in which the seat cushion 2 can be separated from the seating position P1. Further, when the seat cushion motor 402 is driven, the storing operation of the seat cushion 2 is performed. In other words, the seat cushion 2 on which the seatback 3 is placed moves to the storage position 2 in order of FIGS. 2-4. On this occasion, as illustrated in FIG. 3, a free end portion 9f of the front leg 9 rotates in a direction of an arrow N1 and a free end portion 10f of the rear leg 10 rotates in a direction of an arrow N2. Accordingly, the free end portion 9f of the front leg 9 and the free end portion 10f of the rear leg 10 rotate in a direction in which the end portions 9f and 10f are mutually approached, and the front leg 9 and the rear leg 10 come into a substantially horizontal state. Further, as illustrated in FIG. 3, the first link 12 rotates in a clockwise direction (a direction of an arrow M1, a direction in which the first link 12 comes into a substantial horizontal state) about the pivot point 16, and the second link 13 rotates in the clockwise direction (a direction of an arrow M2, a direction in which the second link 12 comes into a substantial horizontal state) about the pivot point 17. In consequence, as indicated by a virtual line in FIG. 4, the folded seat apparatus 1 is stored at the storage position P2 in the recess portion 15 of the floor 4 by means of the supporter 11 of the four link. When the storing operation of the seat apparatus 1 is completed, a storing operation completion signal from the storage switch 202 is transmitted to the ECU 600. On this occasion, in the storage position P2, the seat apparatus 1 is folded in such a manner that the seat cushion 2 is placed at the lower side and the seatback 3 is placed at the upper side. As can be seen from FIGS. 2-4, the seatback 3 is not vertically flipped even in the course of the storing operation from the seating position P1 to the storage position P2 and the seat cushion 2 remains at the lower side and the seatback 3 remains at the upper side.

The returning operation of the seat apparatus 1 from the storage position P2 to the seating position P1 according to the embodiment of the present invention will be explained. When the operating switch 100 is manually operated by the operator in a returning direction in a condition where the folded seat apparatus 1 is stored in the storage position P2 of the floor 4, the seat cushion motor 402 is driven, the first link 12 rotates in an anticlockwise direction (a direction of an arrow M3, a direction in which the first link 12 comes to a stand state) about the pivot point 16 of the first link 12 and the second link 13 rotates in the anticlockwise direction (a direction of an arrow M4, a direction in which the second link 13 comes to a stand state) about the pivot point 17 of the second link 13. In consequence, the seat cushion 2 moves together with the seatback 3 from the storage position P2 to the seating position P1. On this occasion, when the seat cushion 2 placed above the seating position P1 comes down to the seating position P1, the locking device 7 of the front leg 9 engages with the front striker 5 of the vehicle floor 4 and the locking device 8 of the rear leg 10 engages with the rear striker 6 of the vehicle floor 4. In consequence, the seat cushion 2 is automatically locked at the seating position P1 of the floor 4. When the seat cushion 2 of the seat apparatus 1 is locked at the seating position P1, a lock completion signal from the seat lock detecting switch 200 is transmitted to the ECU 600. Further, the folded seatback 3 is moved rearward (the direction of the arrow R) and the stand angle of the seatback is gradually increased.

According to the embodiment of the present invention, the seat cushion motor 402 and the seatback motor 400 can independently be driven from each other and a continuous driving of the single motor is not required. If a single motor is continuously driven, a load applied to the motor is increased and a motor life may be shortened. Therefore, according to the embodiment of the present invention, the load applied to the seat cushion motor 402 and the seatback motor 400 can be reduced and the motors 402 and 400 can thereby be downsized. Accordingly, the motors 402 and 400 have an advantage in mounting to a relatively small space such as the seat apparatus 1 itself. Further, the seatback motor 400 can easily be driven immediately after the seat cushion motor 402 is driven while reducing the driving time of each motor 402 and 400. Likewise, The seat cushion motor 402 can easily be driven immediately after the seatback motor 400 is driven. Accordingly, the operation of the seat cushion 2 and the operation of the seatback 3 can continuously be performed while reducing the load applied to the motors 402 and 400.

Variations of the storing operation and the returning operation of the seat apparatus 1 will be explained hereinafter.

(Storing Operation 1, 2 and 3)

Figure 7:
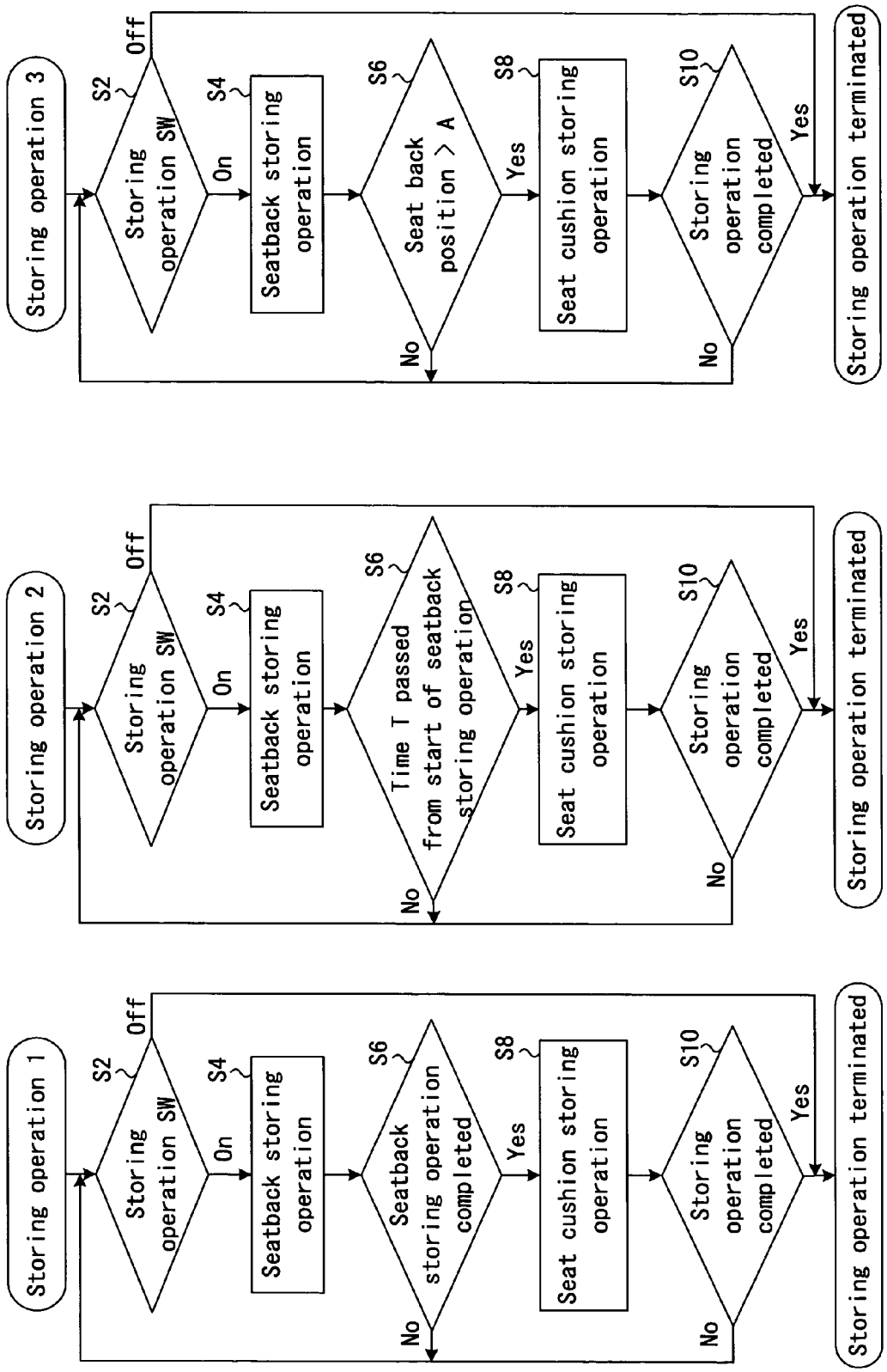
FIG. 7 is a flow chart illustrating storing operations 1, 2 and 3.

A storing operation 1 will be explained hereinafter with reference to FIGS. 7 and 8. As illustrated in FIG. 7, in step S2 of the storing operation 1, an operation state of the operating switch 100 is read for determining if the seat cushion 2 and the seatback 3 are operated in the storing direction. If the operating switch 100 is turned on to operate the seat cushion 2 and the seatback 3 in the storing direction, the storing operation of the stand state seatback 3 is started and the stand angle of the seatback 3 is gradually reduced in step S4. In other words, the storing operation of the seatback 3 is performed prior to the storing operation of the seat cushion 2. In the storing operation of the seatback 3, the seatback 3 having a large stand angle is inclined by the seatback motor 400 so as to be close to the seat cushion 2 for reducing the stand angle of the seatback 3 relative to the seat cushion 2. In the storing operation 1, the storing operation of the seatback 3 is performed prior to the storing operation of the seat cushion 2 because the stand angle of the seatback 3 is generally large at the seating position P1 and a possibility of an interference of the seatback 3 may be increased. Therefore, the storing operation of the seatback 3 is performed in the initial stages. In step 6, completion of the storing operation of the seatback 3 is determined. At the completion of the storing operation of the seatback 3, the seatback 3 is inclined forward so as to be placed on the seat cushion 2 and the stand angle of the seatback 3 is within a minimum range. If the storing operation of the seatback 3 is not completed (step S6: NO), the procedure returns to the step S2 to continue the storing operation of the seatback 3 and to reduce the stand angle of the seatback 3. In contrast, if the storing operation of the seatback 3 is completed (step S6: YES), because the possibility of the interference of the seatback 3 and the seat cushion 2 with the other components of the vehicle may not occur due to a small stand angle of the seatback 3, the storing operation of the seat cushion 2 is started in step S8. In the storing operation of the seat cushion 2, the seat cushion 2 is moved from the seating position P1 to the storage position P2 by driving the seat cushion motor 402. In step S10, completion of the storing operation of the seat cushion 2 is determined. If the storing operation of the seat cushion 2 is not completed (step S10: NO), the procedure returns to the step S2. At this point, because the storing operation of the seatback 3 is completed, a command value from the ECU 600 transmitted to the seatback motor 400 is zero. If the storing operation of the seat cushion 2 is completed (step S10: YES), the storing operation of the seat apparatus 1 is completed. Alternatively, or in addition, an operation starting time of the seat cushion 2 and an operation starting time of the seatback 3 may be set at different times while temporally overlapping the movement of the seat cushion 2 and the seatback 3.

Next, a storing operation 2 will be explained hereinafter with reference to FIGS. 7 and 8. The storing operation 2 is similar to the storing operation 1. As illustrated in FIG. 7, in step S2 of the storing operation 2, the operation state of the operating switch 100 is read for determining if the seat cushion 2 and the seatback 3 are operated in the storing direction. If the operating switch 100 is turned on to operate the seat cushion 2 and the seatback 3 in the storing direction, the storing operation of the seatback 3 is performed prior to the storing operation of the seat cushion 2 and reduces the stand angle of the seatback 3 in step S4. Then, in step S6, an elapsed time of the storing operation of the seatback 3 is determined if a time T has passed from a starting time of the storing operation of the seatback 3. If the time T has not passed (step S6: NO), the storing operation 2 is at an initial stage and the stand angle of the seatback 3 is still at larger degree. On this occasion, because there is the possibility of the interference of seat apparatus 1 with the other components of the vehicle, the procedure returns to step S2 without performing the storing operation of the seat cushion 2 and continues the storing operation of the seatback 3 and reduces the stand angle of the seatback 3. In contrast, if the time T has passed from the starting time of the storing operation of the seatback 3 (step S6: YES), because the interference of the seat apparatus 1 with the other components of the vehicle can be avoided due to the small stand angle of the seatback 3, the storing operation of the seat cushion 2 is started in step S8. Then, the completion of the storing operation of the seat cushion 2 and the seatback 3 is determined in step S10. If the storing operation of at least one of the seat cushion 2 and the seatback 3 is not completed, the procedure returns to step S2 to continue the storing operation. If the storing operations of the both seat cushion 2 and the seatback 3 are completed, the storing operation of the seat apparatus 1 is completed. In a condition where a completion of the storing operation of the seatback 3 and the seat cushion 2 is temporally different, a command value is transmitted to the motor of the at least one of the seat cushion 2 and the seatback 3, the storing operation of which in not completed, for driving. On this occasion, a command value transmitted to the motor of the other one of the seat cushion 2 and the seatback 3, the storing operation of which is completed, is zero. The time T is preliminarily set so that the interference of the seat apparatus 1 with the other components of the vehicle is not generated even when the seat cushion 2 performs the storing operation. The time T is memorized in the memory of the ECU 600 with respect to each type of vehicle. Next, a storing operation 3 will be explained hereinafter with reference to FIGS. 7 and 8. The storing operation 3 performs the steps basically similar to that of the storing operation 2. As illustrated in FIG. 7, in step 2 of the storing operation 3, the operation state of the operating switch 100 is read for determining if the seat cushion 2 and the seatback 3 are operated in the storing direction. If the operating switch 100 is turned on to operate the seat cushion 2 and the seatback 3 in the storing direction, the storing operation of the seatback 3 is performed prior to the storing operation of the seat cushion 2 in step S4. Then, a position of the seatback 3 is determined if the present position of the seatback 3 reaches an intermediate position A in step S6. If the present position of the seatback 3 is not reached to the intermediate position A, because of the possibility of the interference of the seat apparatus 1 with the other components of the vehicle due to the large stand angle of the seatback 3, the procedure returns to step S2 without performing the storing operation of the seat cushion 2 and continues the storing operation of the seatback 3 and reduces the stand angle of the seatback 3. The intermediate position A is preliminarily set so that the interference of the seat apparatus 1 with the other components of the vehicle is not generated even when the seat cushion 2 is moved. The intermediate position A is memorized in the memory of the ECU 600 with respect to each type of vehicle. When the present position of the seatback 3 reaches the intermediate position A, because the possibility of the interference of the seat apparatus 1 with the other components of the vehicle can be avoided due to the small stand angle of the seatback 3, the storing operation of the seat cushion 2 is started in step S8. Then, the completion of the storing operation of the seat cushion 2 and the seatback 3 is determined in step S10. If the storing operation of at least one of the seat cushion 2 and the seatback 3 is not completed, the procedure returns to step S2 to continue the storing operation. In contrast, if the storing operations of the both seat cushion 2 and the seatback 3 are completed (step 10: YES), the storing operation of the seat apparatus 1 is terminated.

Figure 8:
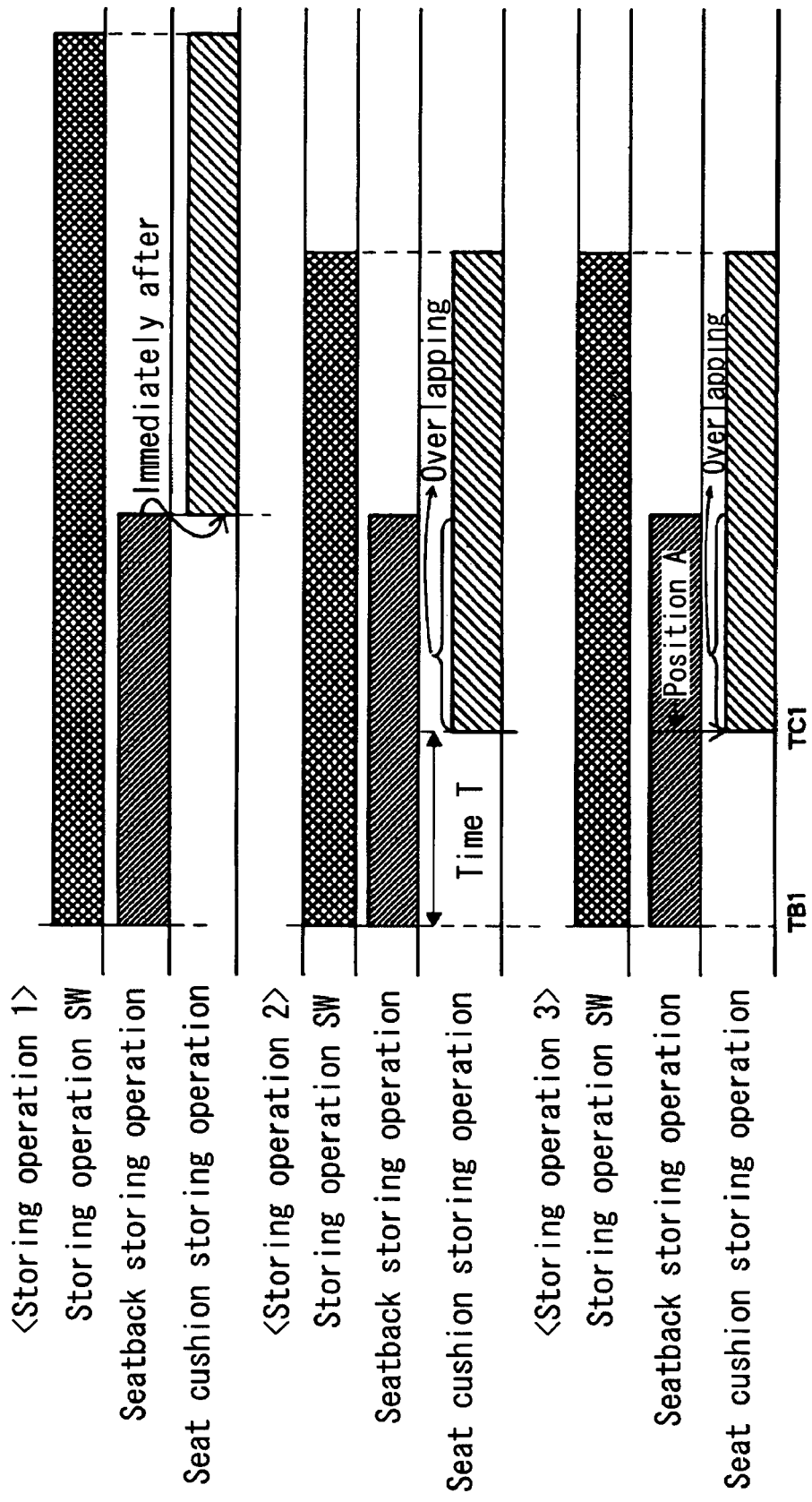
FIG. 8 is a timing chart illustrating the storing operations 1, 2, and 3.

In the storing operation 1, because the seat cushion motor 402 and the seatback motor 400 are independently driven, the storing operation of the seatback 3 is preferentially started as illustrated in FIG. 8. Then, the storing operation of the seat cushion 2 is started immediately after the completion of the storing operation of the seatback 3 without interruption. Therefore, the interference of the seat apparatus 1 with the other components of the vehicle can be prevented while reducing an entire operating time required for the storing operation 1. As long as the operation of the operating switch 100 is continued, the storing operation 1 is continuously performed. According to a timing chart illustrated in FIG. 8, in the storing operation 2, the storing operation of the seatback 3 is preferentially started and the storing operation of the seat cushion 2 is started within a period after the predetermined time T has passed from the start of the storing operation of the seatback 3 and before the storing operation of the seatback 3 is completed. In the storing operation 3, the storing operation of the seat cushion 2 is started at a time TC1 after the seatback 3 is reached to the intermediate position A and before the storing operation of the seatback 3 is completed. Accordingly, as can be seen from FIG. 8, because the operation of the seat cushion 2 and the operation of the seatback 3 are temporally overlapped with each other, the entire operating time of the storing operations 2 and 3 can be reduced relative to the storing operation 1. Therefore, an operating time required for a manual operation of the operating switch 100 can be reduced. Further, the storing operation of the seatback 3 is temporally prioritized relative to the storing operation of the seat cushion 2, an operation starting time TB1 of the seatback 3 is set earlier than an operation starting time TC1 of the seat cushion 2, and the folding operation of the seatback 3 is prioritized. In other words, in FIG. 8, the operation starting time TC1 of the seat cushion 2 is set at different time relative to the operation starting time TB1 of the seatback 3 in a direction in which the operation starting time TC1 is delayed relative to the operation starting time TB1. In consequence, because the storing operation of the seat cushion 2 is performed after the stand angle of the seatback 3 becomes relatively small, the interference of the seat apparatus 1 with the other components of the vehicle can advantageously be prevented.

(Returning Operation 1, 2, and 3)

Figure 9:
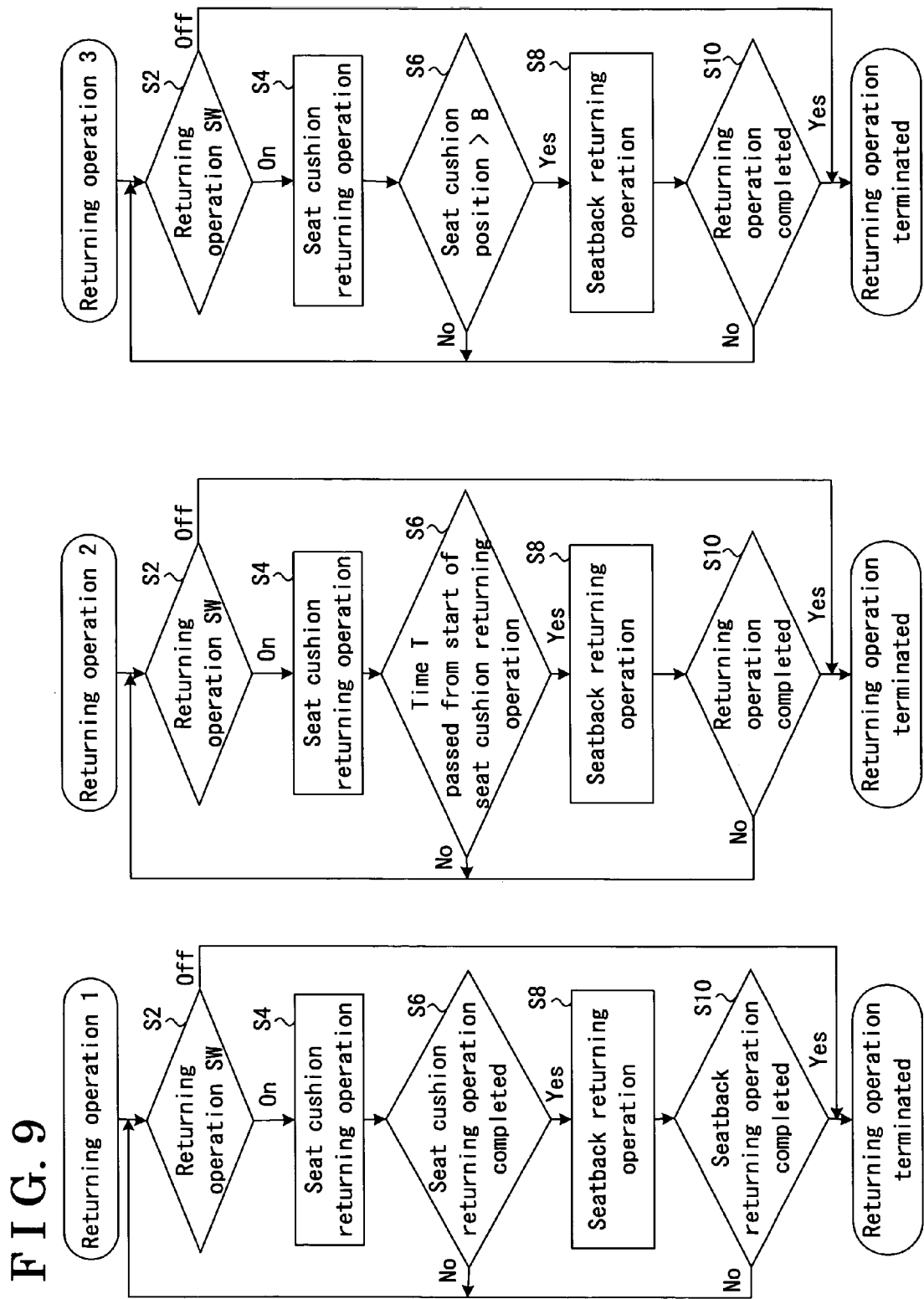
FIG. 9 is a flow chart illustrating returning operations 1, 2, and 3.
Figure 10:
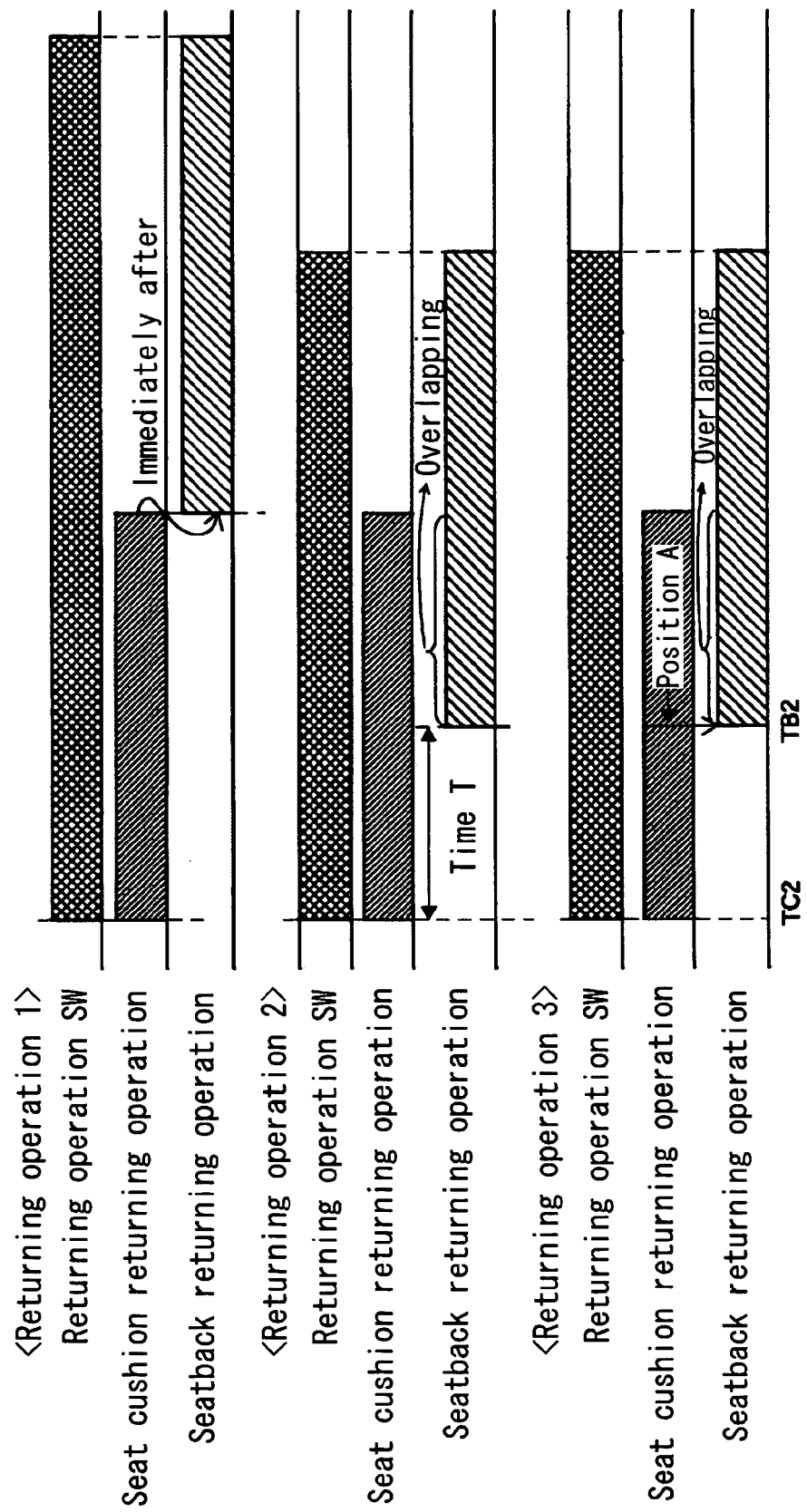
FIG. 10 is a timing chart illustrating the returning operations 1, 2, and 3.

A returning operation 1 will be explained hereinafter with reference to FIGS. 9 and 10. As illustrated in FIG. 9, in step S2 of the returning operation 1, the operation state of the operating switch 100 is read. If the operating switch 100 is turned on to operate the seat cushion 2 and the seatback 3 in the returning direction, the returning operation of the seat cushion 2 is started prior to the returning operation of the seatback 3 in step S4 because the seatback 3 and the seat cushion 2 are overlapped with each other and the stand angle of the seatback 3 is small at the storage position P2. Therefore, possibility of the interference of the seat apparatus 1 with the other components of the vehicle can be prevented even when the returning operation of the seat cushion 2 is performed. In step S6, completion of the returning operation of the seat cushion 2 is determined. If the returning operation of the seat cushion 2 is not completed, the procedure returns to steps S2 and S4 to continue the returning operation of the seat cushion 2. In contrast, if the returning operation of the seat cushion 2 is completed and the seat cushion 2 is locked at the seating position P1 (step S6: YES), the returning operation of the seatback 3 is started and the stand angle of the seatback 3 is gradually increased in step S8. Then, completion of the returning operation of the seatback 3 is determined in step S10. If the returning operation of the seatback 3 is not completed, the procedure returns to step S2 to increase the stand angle of the seatback 3. On this occasion, because the returning operation of the seat cushion 2 is completed and the seat cushion motor 402 is not required to be driven, a command value from the ECU 600 to the seat cushion motor 402 is zero. When the returning operation of the seatback 3 is completed (step S10: YES), the returning operation of the seat apparatus 1 is terminated. Alternatively, or in addition, the movement starting of the seat cushion 2 and the operation starting time of the seatback 3 may be set at different times while temporally overlapping the movement of the seat cushion 2 and the movement of the seatback 3.

A returning operation 2 will be explained hereinafter with reference to FIGS. 9 and 10. As illustrated in FIG. 9, in step S2 of the returning operation 2, the operation state of the operating switch 100 is read. If the operating switch 100 is turned on to operate the seat cushion 2 and the seatback 3 in the returning direction, the returning operation of the seat cushion 2 is started prior to the returning operation of the seatback 3 in step S4 because the small stand angle of the seatback 3 may be required at an initial stage of the returning operation 2. Then, an elapsed time of the returning operation of the seat cushion 2 is determined if a time T has passed from a starting time of the returning operation of the seat cushion 2 in step S6. If the time T has not passed, because of the possibility of the interference of the seat apparatus 1 with the other components of the vehicle, the procedure returns to steps S2 and S4 to continue the returning operation of the seat cushion 2 without performing the returning operation of the seatback 3. In contrast, when the time T has passed from the starting time of the returning operation of the seat cushion 2, because the possibility of the interference of the seat apparatus with the other components of the vehicle can be avoided, the returning operation of the seatback 3 is started and the stand angle of the seatback 3 is gradually increased in step S8. Then, the completion of the returning operation of the seat cushion 2 and the seatback 3 is determined in step S10. If the returning operation of at least one of the seat cushion 2 and the seatback 3 is not completed (step S10: NO), the procedure returns to step S2. In a condition where the completion of the storing operation of the seatback 3 and the completion of the storing operation of the seat cushion 2 are temporally different, a command value is transmitted to the motor of the at least one of the seat cushion 2 and the seatback 3, the storing operation of which in not completed, for driving. On this occasion, a command value transmitted to the motor of the other one of the seat cushion 2 and the seatback 3, the storing operation of which is completed, is zero. If the returning operations of both the seat cushion 2 and the seatback 3 are completed (step S10: YES), the returning operation of the seat apparatus 1 is terminated. The time T of the returning operation 2 is set so that the interference of the seat apparatus 1 with the other components of the vehicle is not generated even when the returning operation of the seatback 3 is performed. The time T is memorized in the memory of the ECU 600 with respect to each type of vehicle. A returning operation 3 will be explained hereinafter with reference to FIGS. 9 and 10. The returning operation 3 performs the steps basically similar to that of the returning operation 2. However, in the returning operation 3, the position of the seat cushion 2 is determined if the present position of the seat cushion 2 reaches a predetermined intermediated position B in step S6. If the present position of the seat cushion 2 is not reached to the intermediate position B (step S6: NO), because the possibility of the interference of the seat apparatus 1 with the other components of the vehicle may occur when the seat back 3 is moved rearward, the procedure returns to step S2 without performing the returning operation of the seatback 3 and continues the returning operation of the seat cushion 2. In contrast, if the present position of the seat cushion 2 reaches the intermediate position B (step S6: YES), because the possibility of the interference of the seat apparatus 1 with the other components of the vehicle can be avoided, the returning operation of the seatback 3 is started and the stand angle of the seatback 3 is increased in step S8. Then, the completion of the returning operation of the seat cushion 2 and the seatback 3 is determined in step S10. If the returning operations of the both seat cushion 2 and the seatback 3 are completed, the returning operation of the seat cushion 1 is terminated. The intermediated position B of the returning operation 3 is set so that the interference of the seat apparatus 1 is not generated even when the returning operation of the seatback 3 is performed. The intermediated position B is memorized in the memory of the ECU 600 with respect to each type of vehicle. As can be seen from FIG. 10, the returning operation of the seat cushion 2 is preferentially started relative to the returning operation of the seatback 3 in the returning operation 1. Then, the returning operation of the seatback 3 is promptly started immediately after the completion of the returning operation of the seat cushion 2 without interruption. The aforementioned control can easily be performed because the seat cushion motor 402 and the seatback motor 400 are independently driven. Therefore, the interference of the seat apparatus 1 with the other components of the vehicle can be prevented while reducing the entire operating time required for the returning operation 1. Further, as can be seen from FIG. 10, because the movement of the seat cushion 2 and the movement of the seatback 3 are temporally overlapped with each other, the entire operating time of the returning operations 2 and 3 can be reduced relative to the returning operation 1. Moreover, because an operation starting time TC2 of the seat cushion 2 and an operation starting time TB2 of the seatback 3 are temporally shifted in a direction in which the interference can be prevented, the interference of the seat apparatus 1 with the other components of the vehicle can advantageously be prevented.

(Storing Operation 4)

Figure 11:
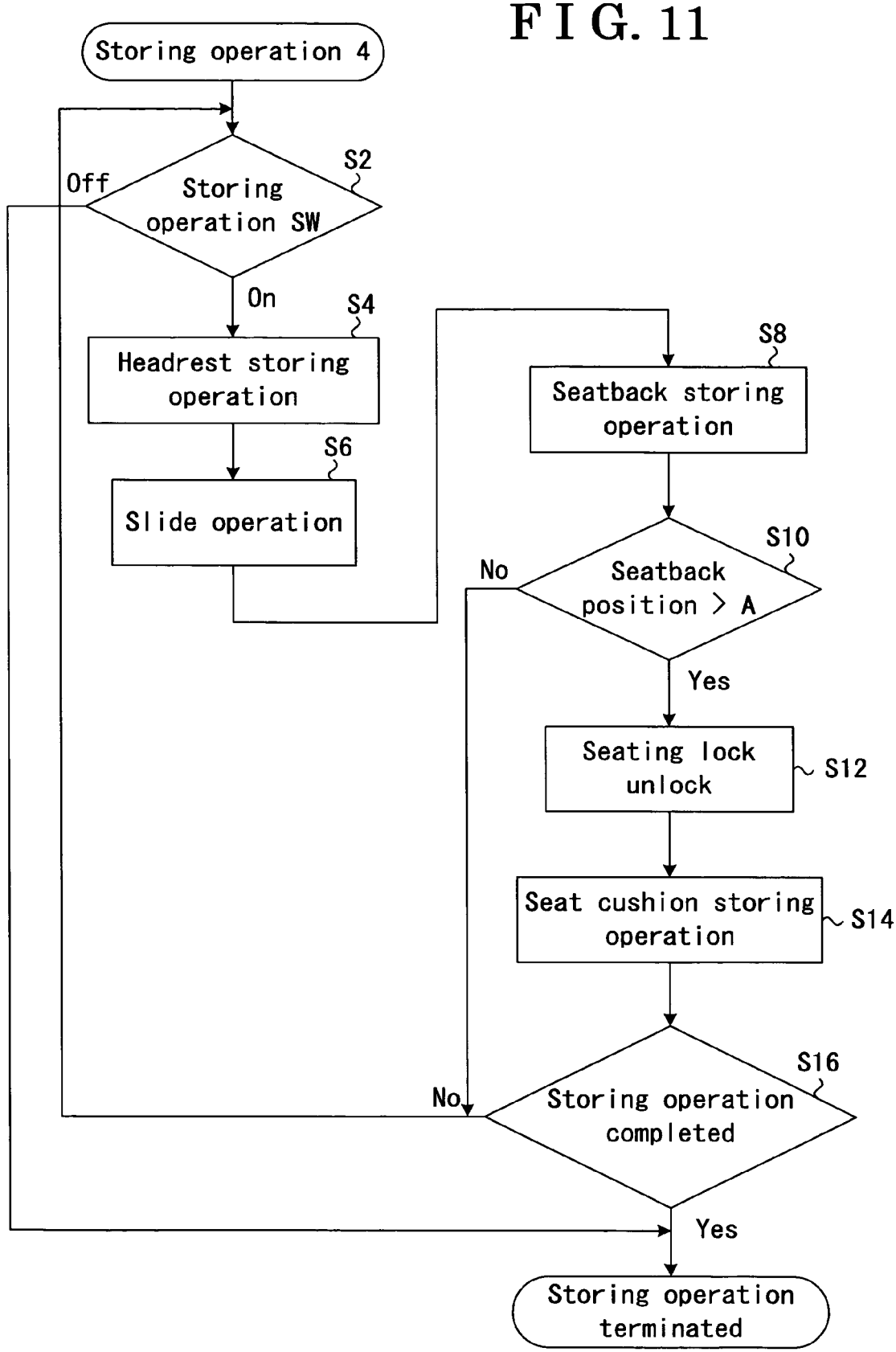
FIG. 11 is a flow chart illustrating a storing operation 4.
Figure 12:
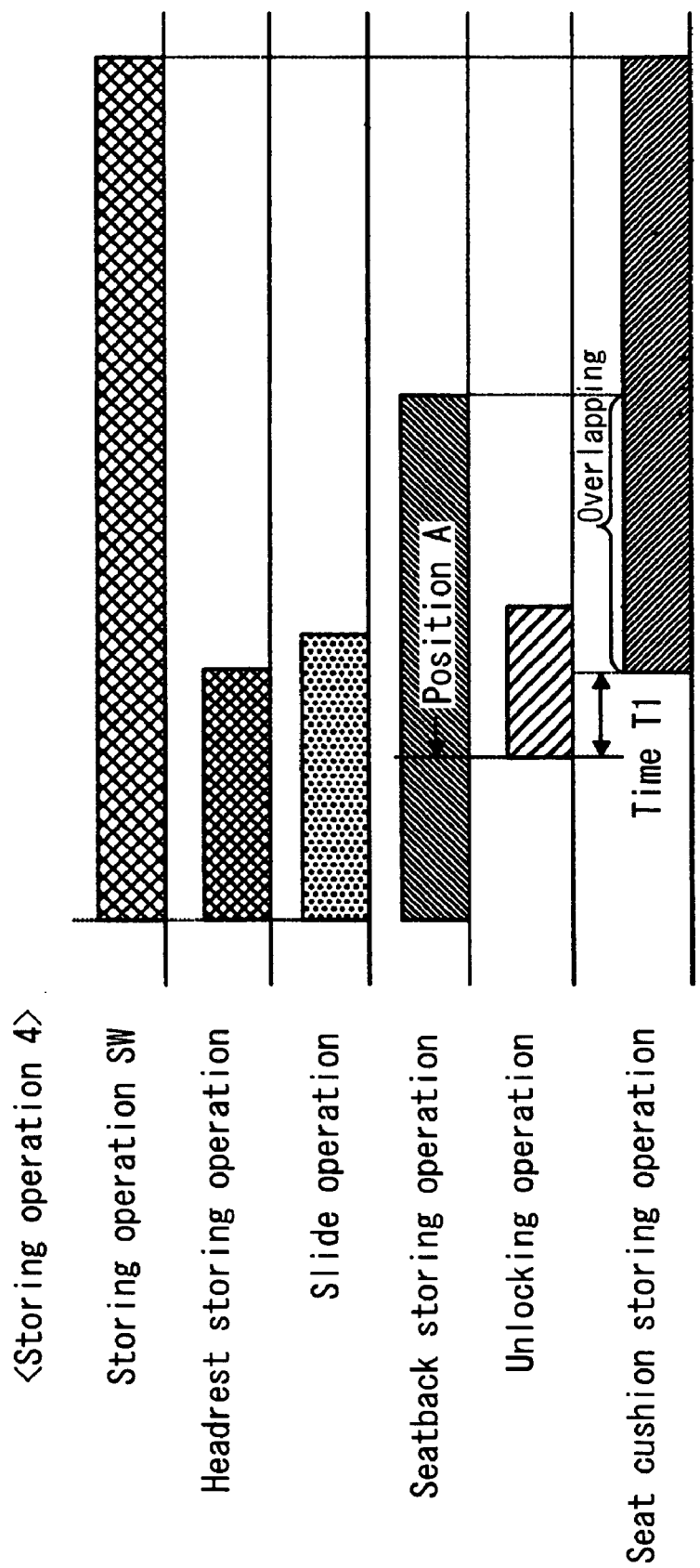
FIG. 12 is a timing chart illustrating the storing operation 4.

A storing operation 4 will be explained hereinafter with reference to FIGS. 11 and 12. As illustrated in FIG. 11, in step S2 of the storing operation 4, the operation state of the operating switch 100 is read for determining if the seat cushion 2 and the seatback 3 are operated in the storing direction. If the operating switch 100 is turned on to operate the seat cushion 2 and the seatback 3 in the storing direction, a storing operation of the headrest 37 is performed in a direction in which the headrest 37 is stored in the headrest storage position in step S4. Further, a slide operation of the frame 2' of the seat cushion 2 is performed in a direction in which the interference of the seat apparatus 1 with the other components of the vehicle is avoided in step S6. The storing operation of the frame 2' of the seat cushion 2 is performed prior to the storing operation of the seat cushion 2. Accordingly, an interference of the headrest 37, of the frame 2' of the seat cushion 2, and of the seat cushion 2 with the other components of the vehicle can advantageously be prevented. Next, the storing operation of the seatback 3 is started prior to the storing operation of the seat cushion 2 and the seatback 3 is folded in step S8 in order to reduce the stand angle of the seatback 3 at early stages in the storing operation. Then, the position of the seatback 3 is determined if the present position of the seatback 3 reaches the intermediate position A in step S10. The intermediate position A is preliminarily set so that the interference of the seat apparatus 1 with the other components of the vehicle is not generated even when the seat cushion 2 is moved. The intermediate position A is memorized in the memory of the ECU 600 with respect to each type of vehicle. If the present position of the seatback 3 is not reached to the intermediate position A (step S10: NO), because of the highly possibility of the interference of the seat apparatus 1 with the other components of the vehicle due to the large stand angle of the seatback 3, the procedure returns to step S2, without performing the storing operation of the seat cushion 2, to continue the storing operation of the headrest 37, to continue the slide operation of the frame 2', and to continue the storing operation of the seatback 3 in a direction in which the interference thereof with the other components of the vehicle can be prevented. In contrast, if the present position of the seatback 3 reaches the intermediate position A (step S10: YES), because the possibility of the interference of the seat apparatus 1 with the other components of the vehicle can be avoided due to the small stand angle of the seatback 3, the lock devices 7 and 8 are unlocked in step S12 and the seat cushion 2 comes into a state in which the seat cushion 2 can be detached from the seating position P1 in order to perform the storing operation of the seat cushion 2. Next, the storing operation of the seat cushion 2 is started in step S14. Then, the completion of all storing operations is determined in step S16. If any one of the storing operations is not completed (step S16: NO), the procedure returns to step S2. On this occasion, a command value transmitted to the motors, the storing operation of which is completed, is zero. When all the storing operations are completed (step S16: YES), the storing operation of the seat apparatus 1 is terminated. As can be seen from FIG. 12, the storing operation of the headrest 37, the slide operation of the frame 2' of the seat cushion 2, and the storing operation of the seatback 3 are temporally overlapped one another in the storing operation 4. Therefore, the entire operating time can be reduced while preventing the interference of the seat cushion 2 and the seatback 3 with the other components of the vehicle. Further, when the present position of the seatback 3 is not reached to the intermediate position A, because of the possibility of the interference of the seat apparatus 1 with the other components of the vehicle, the operation of the seat cushion 2 is not performed. However, if the present position of the seatback 3 reaches the intermediated position A, because the possibility of the interference of the seat apparatus 1 with the other components of the vehicle is avoided due to the small stand angle of the seatback 3, the unlock operation of the loch devices 7 and 8 is started. As illustrated in FIG. 12, the storing operation of the seat cushion 2 is started after a time $T_1$ has passed from a start of the unlock operation. Accordingly, in the storing operation 4, the storing operation of the seatback 3 is performed prior to the storing operation of the seat cushion 2 and the stand angle of the seatback 3 is reduced at early stages for preventing the interference of the seat apparatus 1 with the other components of the vehicle. Further, because the operation of the seatback 3 and the operation of the seat cushion 2 are temporally overlapped with each other in the storing operation 4, the entire operating time can be reduced.

(Storing Operation 5)

Figure 13:
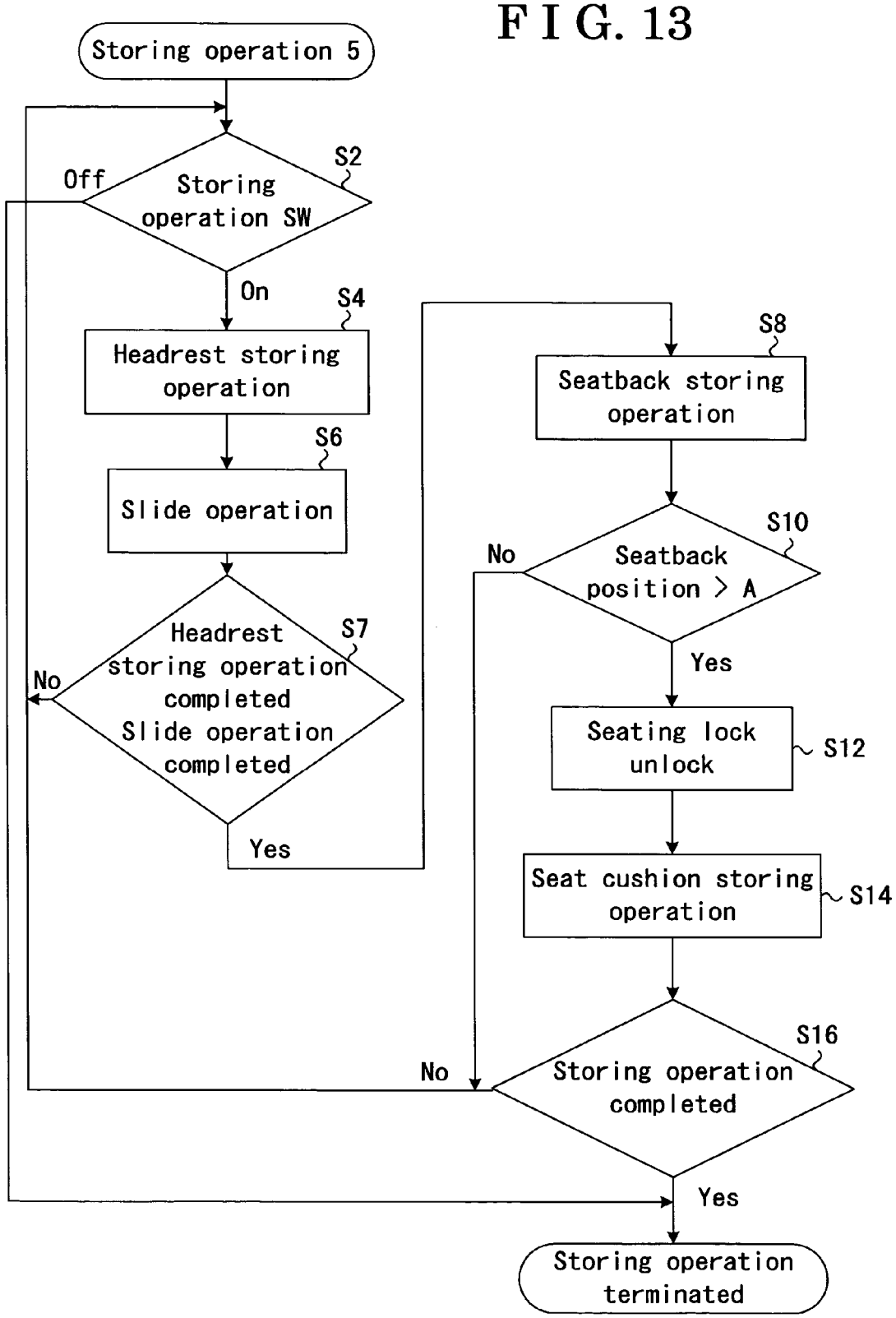
FIG. 13 is a flow chart illustrating a storing operation 5.
Figure 14:
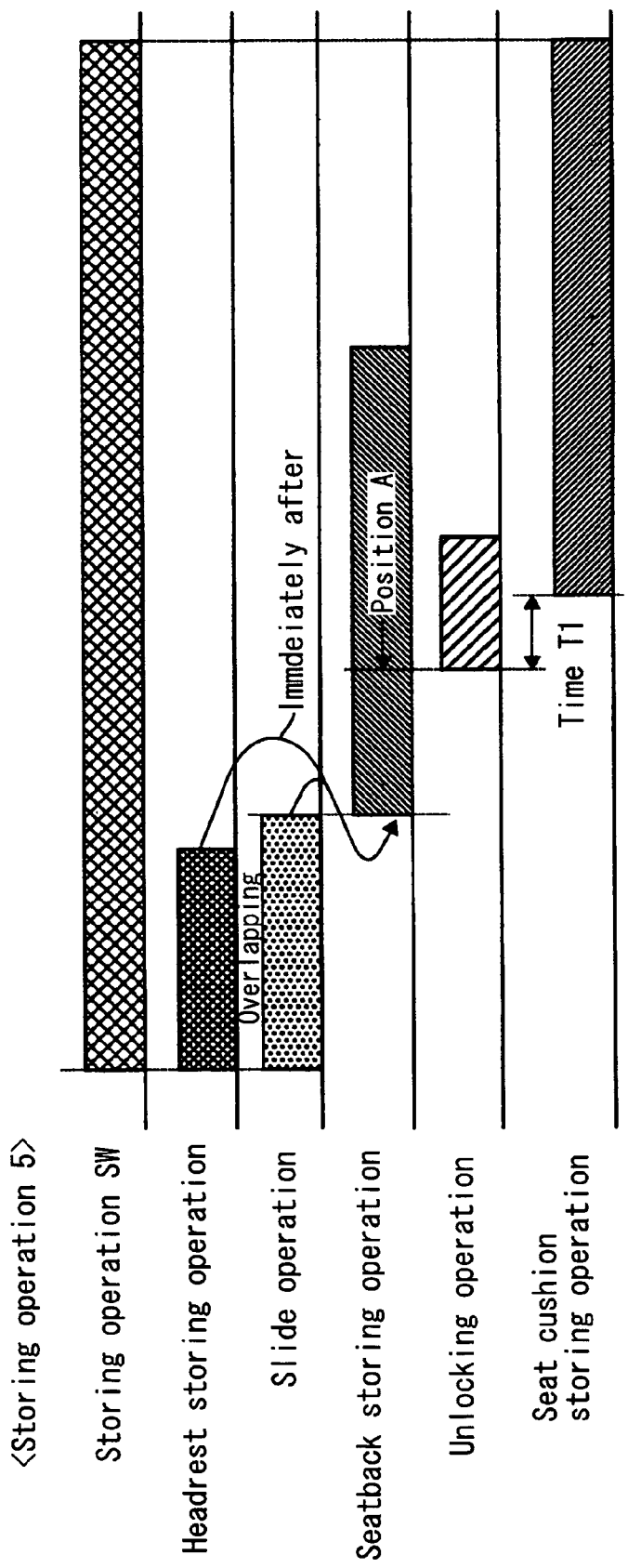
FIG. 14 is a timing chart illustrating the storing operation 5.

A storing operation 5 will be explained hereinafter with reference to FIGS. 13 and 14. A flow chart of the storing operation 5 illustrated in FIG. 13 is basically similar to that of the storing operation 4 illustrated in FIG. 11. More specifically, after step S6, the completion of the storing operation of the headrest 37 and the slide operation of the frame 2' of the seat cushion 2 is determined in step S7. If the operation of at least one of the headrest 37 and the fame 2' of the seat cushion 2 is not completed (step S7: NO), the procedure returns to step S2 to continue the operation. The storing operation of the headrest 37 and the slide operation of the frame 2' of the seat cushion 2 are preferentially performed and the storing operation of the seatback 3 is performed after the completion of the operations of the headrest 37 and the frame 2'. Therefore, capability of preventing the interference of the seat apparatus 1 with the other components of the vehicle can further be increased even when the vehicle compartment has a small space. When the storing operation of the headrest 37 and slide operation of the frame 2' of the seat cushion 2 are completed (step S7: YES), the storing operation of the seatback 3 is started prior to the storing operation of the seat cushion 2 in step S8. Thereby, the stand angle of the seatback 3 can be reduced at early stages in the storing operation. Further, the storing operation of the seat apparatus 1 is completed through the steps S10, S12, S14 and S16. As can be seen from a timing chart of FIG. 14, because the storing operation of the headrest 37 and the slide operation of the frame 2' of the seat cushion 2 are temporally overlapped with each other in the storing operation 5, the entire operating time can be reduced. Further, the storing operation of the seatback 3 is promptly started immediately after the completion of the storing operation of the headrest 37 and the completion of the slide operation of the frame 2' of the seat cushion 2 without interruption. Therefore, the entire operating time can be reduced. Further, when the present position of the seatback 3 reaches the intermediate position A, because the possibility of the interference of the seat apparatus 1 with the other components of the vehicle is avoided due to the small stand angle of the seatback 3, the unlock operation of the lock devices 7 and 8 is started. The storing operation of the seat cushion 2 is started after the time $T_1$ has passed from the start of the unlock operation. As illustrated in FIG. 14, because the operation of the seatback 3 and the operation of the seat cushion 2 are temporally overlapped with each other, the entire operating time can be reduced in the storing operation 5.

(Returning Operation 4)

Figure 15:
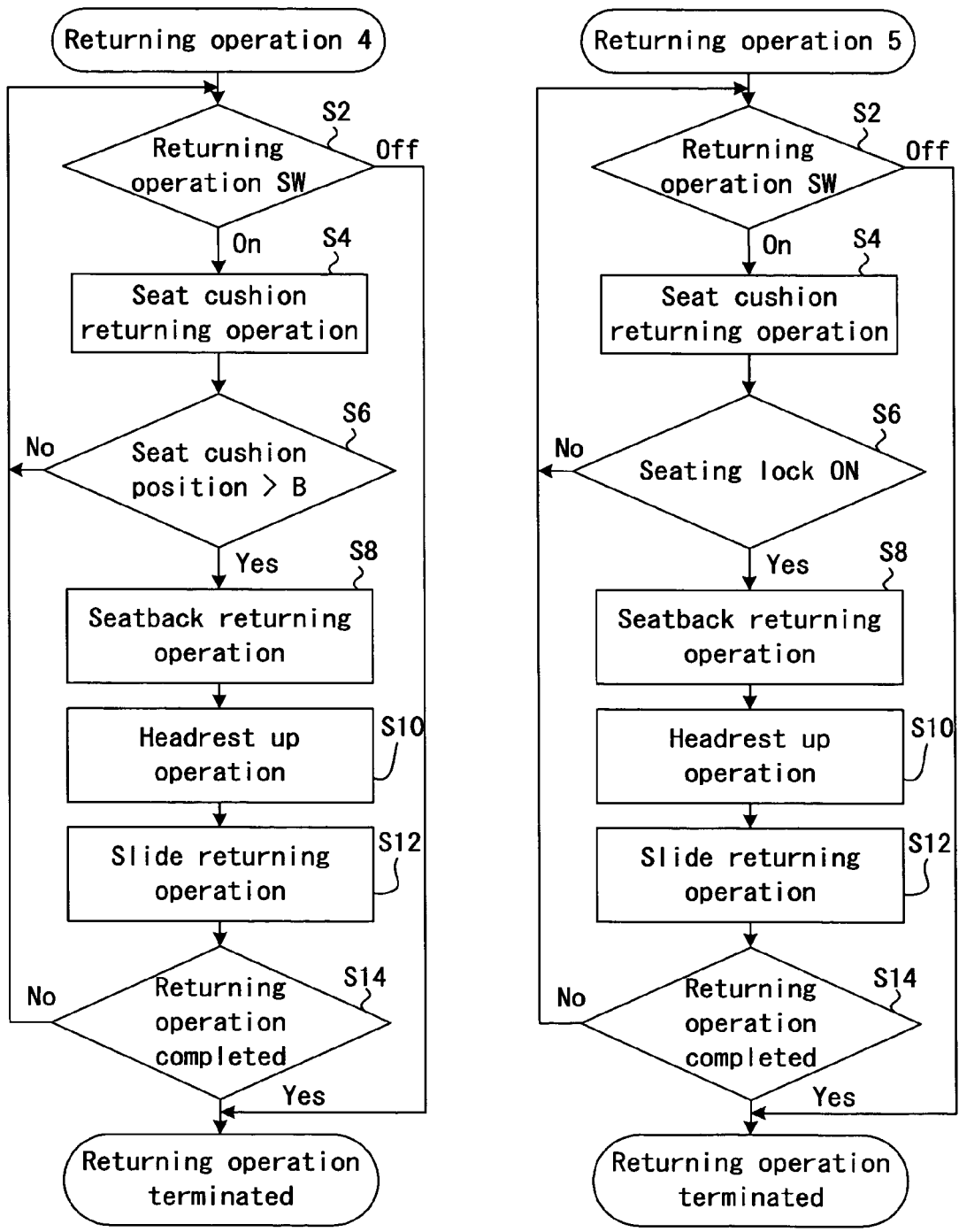
FIG. 15 is a flow chart illustrating returning operations 4 and 5.
Figure 16:
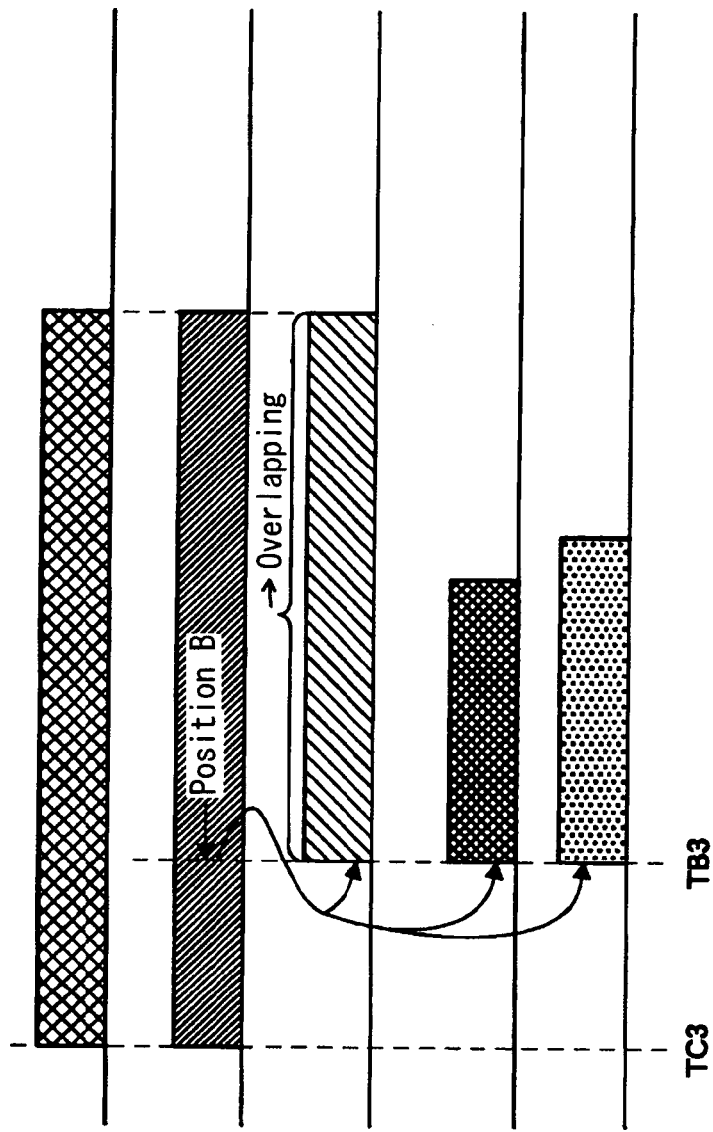
FIG. 16 is a timing chart illustrating the returning operation 4.

A returning operation 4 will be explained hereinafter with reference to FIGS. 15 and 16. As illustrated in FIG. 15, in step S2 of the returning operation 4, the operation state of the operating switch 100 is read for determining if the seat cushion 2 and the seatback 3 are operated in the returning direction. If the operating switch 100 is turned on to operate the seat cushion 2 and the seatback 3 in the returning direction, the returning operation of the seat cushion 2 is performed prior to the returning operation of the seatback 3 in step S4. It is because, at the storing position P2, the seatback 3 is placed on the seat cushion 2 and the stand angle of the seatback 3 is small. Thus, the interference of the seatback 3 may not occur. Accordingly, the returning operation of the seat cushion 2 is performed in the initial stages. Then, the position of the seat cushion 2 is determined if the present position of the seat cushion 2 reaches the intermediate position B in step S6. If the present position of the seat cushion 2 is not reached to the intermediate position B (step S6: NO), because of the possibility of the interference of the seat apparatus 1 with the other component of the vehicle, the procedure returns to step S2 without operating the seatback 3 in the returning direction and continues the returning operation of the seat cushion 2. In contrast, if the present position of the seat cushion reaches the intermediate position B (step S6: YES), because the possibility of the interference of the seat apparatus 1 with the other components of the vehicle is avoided, the returning operation of the seatback 3 is started and the stand angle of the seatback 3 is increased in step S8. Then, an up operation of the headrest 37 to the headrest using position is started in step S10 and the slide returning operation of the frame 2' of the seat cushion 2 is started in step S12. Accordingly, the returning operation of the seat cushion 2, the up operation of the headrest 37, and the slide operation of the frame 2' of the seat cushion 2 are started after the possibility of the interference of the seat apparatus 1 with the other components of the vehicle is avoided. The intermediate position B is preliminarily set so that the interference of the seat apparatus 1 with the other components of the vehicle is not generated even when the seat apparatus 1 is moved. The intermediate position B is memorized in the memory of the ECU 600 with respect to each type of vehicle. Then, the completion of all returning operations is determined in step S14. If the operation of at least one of the seat cushion 2, the headrest 37, and the frame 2' of the seat cushion 2 is not completed (step S14: NO), the procedure returns to step S2 to continue the operation of the at least one of the seatback 3, the seat cushion 2, the headrest 37, and the frame 2' of the seat cushion 2. On this occasion, a command value is transmitted to the motor of the at least one of the seatback 3, the seat cushion 2, the headrest 37, and the frame 2', the operation of which in not completed, for driving. Further, a command value transmitted to the motor, the storing operation of which is completed, is zero. If all the returning operations are completed (step S14: YES), the returning operation of the seat apparatus 1 is terminated. As can be seen from FIG. 16, because the returning operation of the seat cushion 2 and the returning operation of the seatback 3 are temporally overlapped with each other in the returning operation 4, the entire operating time can be reduced. In addition, because the operation of the headrest 37 and the slide operation of the frame 2' of the seat cushion 2 are temporally over lapped with the returning operation of the seat cushion 2 and the returning operation of the seatback 3, the entire operating time can further be reduced. As illustrated in FIG. 16, an operation time of the headrest 37 is shorter than a returning operation time of the seatback 3 or a returning operation time of the seat cushion 2. Further, a slide operation time of the frame 2' of the seat cushion 2 is shorter than the returning operation time of the seatback 3 or the returning operation time of the seat cushion 2. In the returning operation 4, an operation starting time TC3 of the seat cushion 2 and an operation starting time TB3 of the seatback 3 are set at different times while the movement of the seat cushion 2 and the movement of the seatback are temporally overlapped with each other. Accordingly, the interference of the seat cushion 2 and the seatback 3 are advantageously prevented while reducing the movement time.

(Returning Operation 5)

Figure 17:
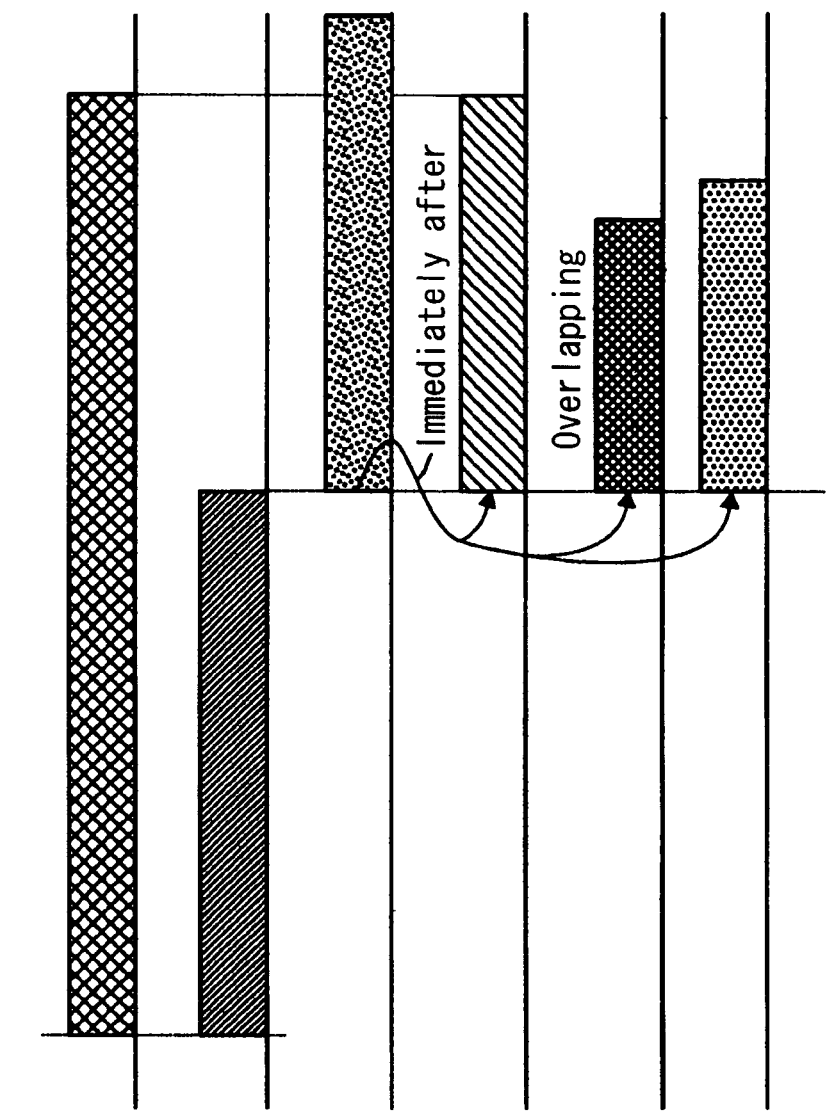
FIG. 17 is a timing chart illustrating the returning operation 5.

A returning operation 5 will be explained hereinafter with reference to FIGS. 15 and 17. A flow chart of the returning operation 5 is basically similar to that of the returning operation 4. As illustrated in FIG. 15, in step S2 of the returning operation 5, the operation state of the operating switch 100 is read for determining if the seat cushion 2 and the seatback 3 are operated in the returning direction. If the operating switch 100 is turned on to operate the seat cushion 2 and the seatback 3 in the returning direction, the returning operation of the seat cushion 2 is performed prior to the returning operation of the seatback 3 in step S4. At this stage, the stand angle of the seatback 3 is small and the headrest 37 and the frame 2' of the seat cushion 2 are stored in the storage position. Next, the status of the seat cushion 2 is determined if the seat cushion 2 is reached and locked at the seating position P1 in step S6. The step S6 serves as a lock determining means for determining if the seat cushion 2 moved from the storage position P2 is reached and locked at the seating position P1. When the seat cushion 2 reaches the seating position P1 from the storage position P2, the lock devices 7 and 8 are automatically locked and the seat cushion 2 is automatically locked to the floor 4 at the seating position P1. If the seat cushion 2 is not reached to the seating position P1 (step S6: NO), the procedure returns to step S2 to continue the returning operation of the seat cushion 2 until the seat cushion 2 is locked at the seating position P1. In contrast, when the seat cushion 2 reaches the seating position P1 (step S6:YES), the returning operation of the seatback 3 is started in step S8, the up operation of the headrest 37 is started in step S10, and the slide operation of the frame 2' of the seat cushion 2 is started in step S12. Then, the completion of the all operations is determined in step S14. If the operation of at least one of the seat cushion 2, the seatback 3, the headrest 37, and the frame 2' is not completed, the procedure returns to step S2 to continue the operation of the at least one of the seat cushion 2, the seatback 3, the headrest 37, and the frame 2' of the seat cushion 2. On this occasion, a command value is transmitted to the motor of the at least one of the seat cushion 2, the seatback 3, the headrest 37, and the frame 2', the operation of which in not completed, for driving. Further, a command value transmitted to the motor, the storing operation of which is completed, is zero. If all the returning operations are completed (step S14: YES), the returning operation of the seat apparatus 1 is terminated. Because the seat cushion motor 402 and the seatback motor 400 are independently driven, the returning operation of the seatback 3 can promptly be operated immediately after the completion of the returning operation of the seat cushion 2 without intervals as can be seen from FIG. 17. Therefore, the entire operating time can advantageously be reduced. Further, because the operation of the headrest 37, the slide operation of the seat cushion 2, and the returning operation of the seatback 3 are temporally overlapped with each other, the entire operating time can further be reduced. Alternatively, or in addition, the operation of the seatback 3 and the operation of the seat cushion 2 can temporally be overlapped with each other in a condition where the operation starting time of the seatback 3 and the operation starting time of the seat cushion 2 are set at different times.

(Storing Operation Speed Control a)

Figure 18:
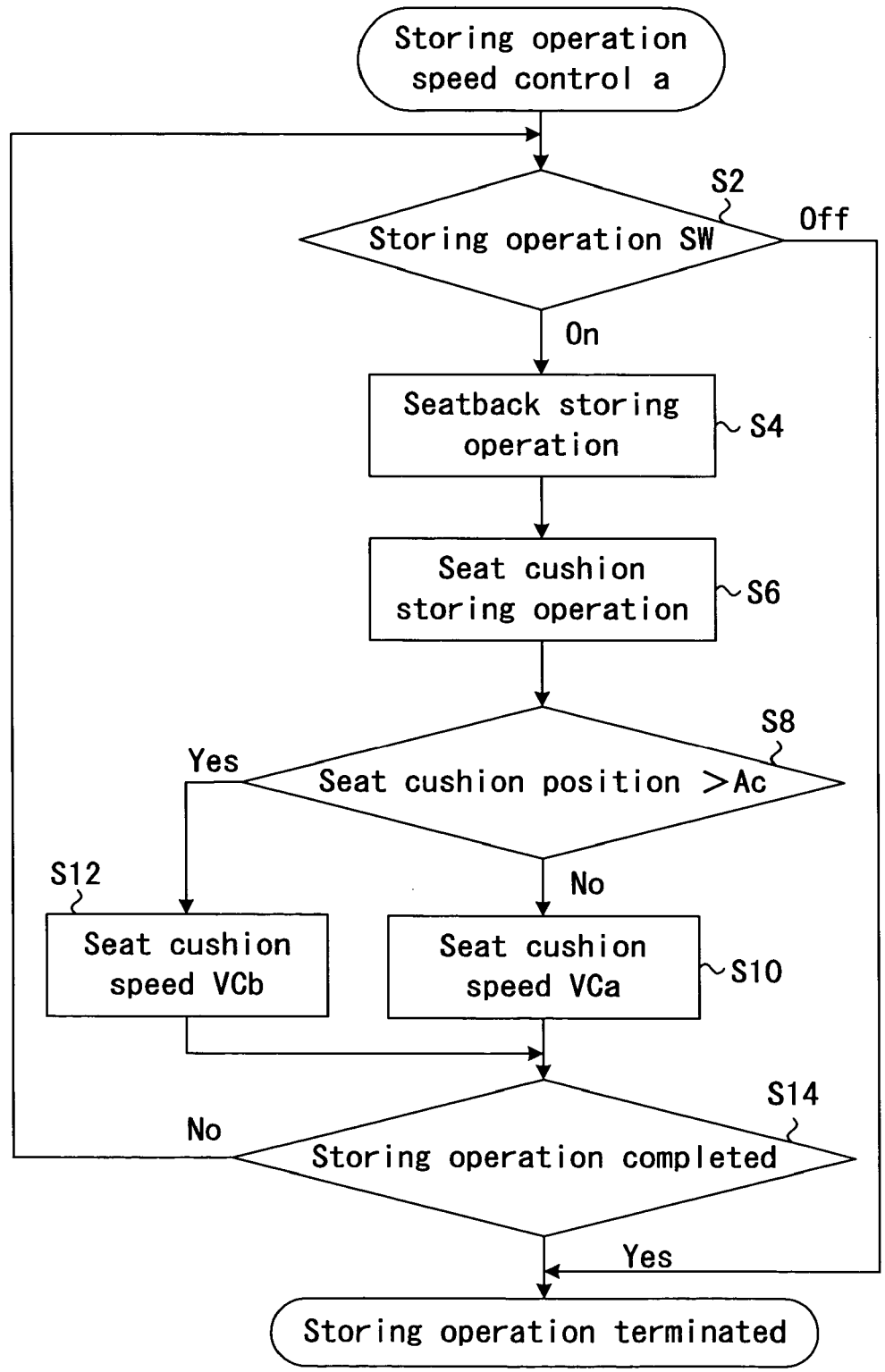
Figure 19:
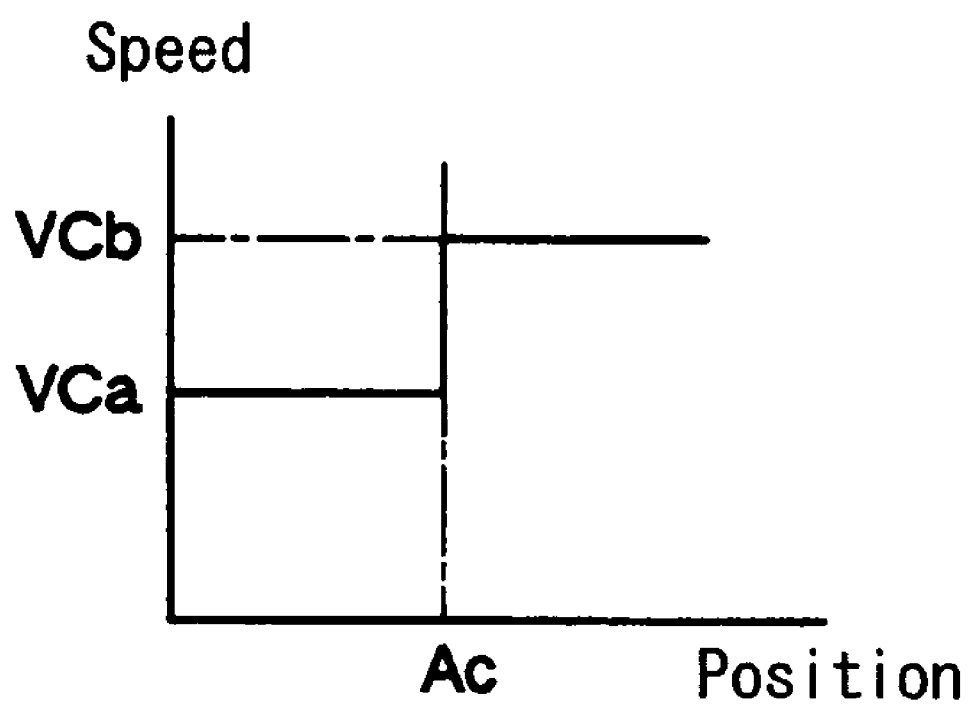

A storing operation speed control a will be explained hereinafter with reference to FIGS. 18 and 19. As illustrated in FIG. 18, the entire operating time is reduced in the storing operation speed control a by temporally overlapping the operation of the seatback 3 and the seat cushion 2. In the storing operation speed control a, the operation state of the operating switch 100 is read in step S2. If the operating switch 100 is turned on to operate the seat cushion 2 and the seatback 3 in the storing operation, the storing operation of the seatback 3 is started in step S4 and the storing operation of the seat cushion 2 is started in step S6. Accordingly, the storing operation of the seatback 3 and the storing operation of the seat cushion 2 are performed at about the same time. Then, it is determined if the present position of the seat cushion 2 reaches the intermediate position Ac in step S8. The intermediate position Ac is set so that the interference of the seat apparatus 1 with the other components of the vehicle is not generated even when an operating speed of the seat cushion 2 is increased. The intermediate position Ac is memorized in the memory of the ECU 600 with respect to each type of vehicle. If the present position of the seat cushion 2 is not reached to the intermediate position Ac (step S8: NO), because of the possibility of the interference of the seat apparatus 1 with the other components of the vehicle, the operating speed of the seat cushion 2 is set at VCa (VCa is relatively slower than VCb). It is because, at this point, the stand angle of the seatback 3 may still be large since the storing operation of the seatback 3 and the storing operation of the seat cushion 2 are started at about the same time. Therefore, if the operating speed of the seat cushion 2 is not at lower speed, the interference of the seat cushion 1 with the other components of the vehicle may be generated. In contrast, if the present position of the seat cushion 2 reaches the intermediate position Ac (step S8: YES), the interference of the seat apparatus 1 can be avoided even when the operating speed of the seat cushion 2 is increased. Therefore, the operating speed of the seat cushion 2 is set at VCb (VCb is relatively faster than VCa) in step S12 for reducing the entire operation time. The step S8 severs as a position determining means for determining if a moved position of the seat cushion 2 reaches a predetermined position on the basis of physical quantity regarding the seat cushion 2 detected by means of the physical quantity detecting means. Further, the step S12 serves as a speed change command means which outputs a command for changing (increasing) the operating speed of the seat cushion 2 from an initial operating speed. Then, the completion of the storing operation of the seat apparatus 1 is determined in step S14. If at least one of the storing operations is not completed (step S14: NO), the procedure returns to step S2 to perform at least one of the storing operations, which is not completed. If the storing operation of the seat apparatus 1 is completed (step S14: YES), the storing operation is terminated. In the storing operation speed control a, the operating time is divided into an early operation period and a later operation period as illustrated in FIG. 19. The operating speed of the seat cushion 2 is set at relatively lower speed in the early operation period and the operating speed of the seat cushion 2 is set at relatively higher speed in the later operation period. Alternatively, or in addition, the operating time may be divided into the early operation period, a middle operation period and the later operation period. On this occasion, the operating speed of the seat cushion 2 may be set at relatively lower speed in the early operation period and the middle operation period and the operating speed of the seat cushion 2 may be increased in the later operation period so that the operating speed in the later operation period becomes relatively faster than the operating speed in the early operation period. Further, alternatively, or in addition, the operating speed of the seat cushion 2 may be set at relatively lower speed in the early operation period and the operating speed of the seat cushion 2 may be increased in the middle operation period and the later operation period so that the operating speed in the later operation period becomes relatively faster than the operating speed in the early operation period.

(Storing Operation Speed Control b)

Figure 20:
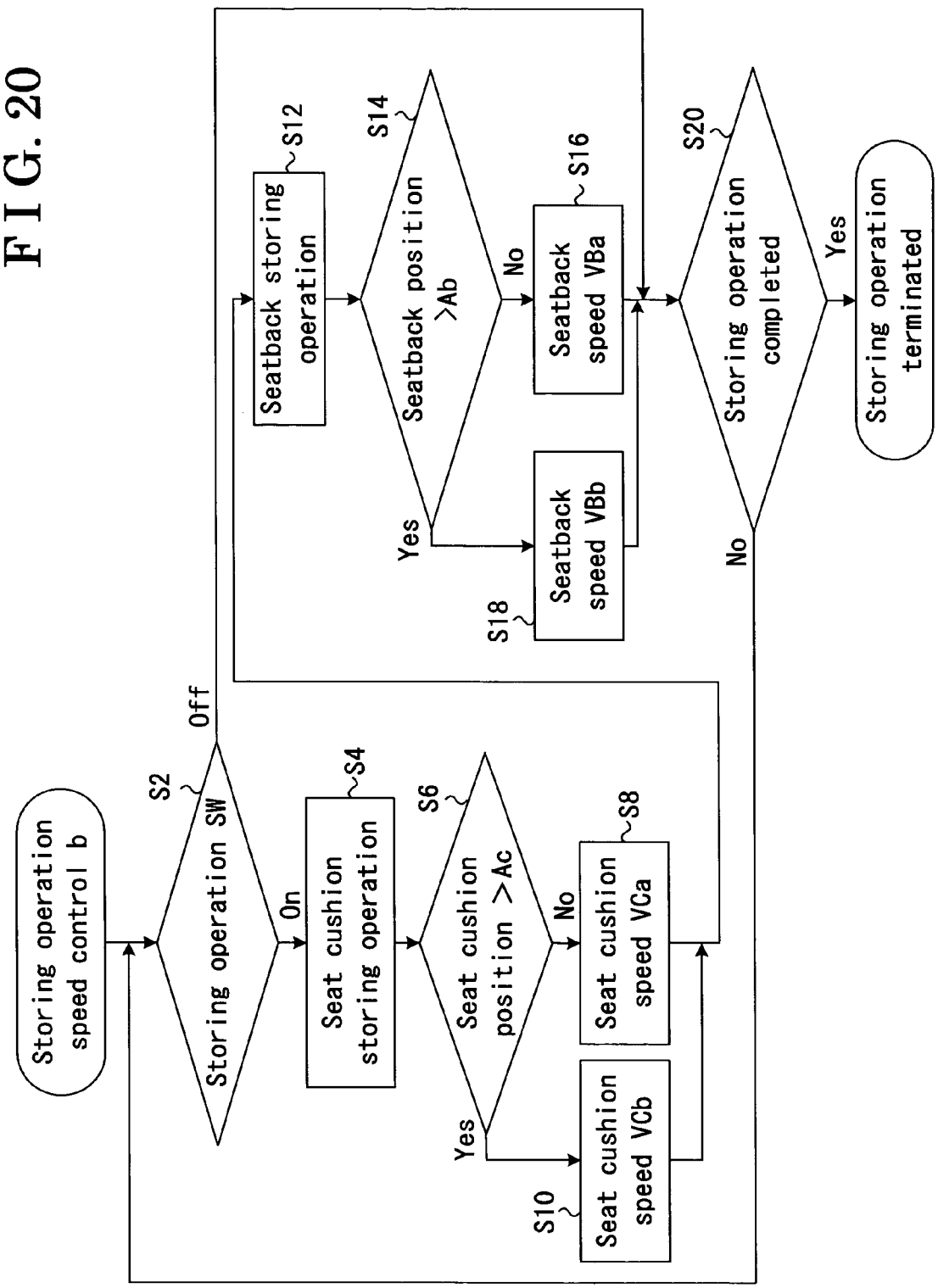
FIG. 20 is a flow chart illustrating a storing operation speed control b.
Figure 21:
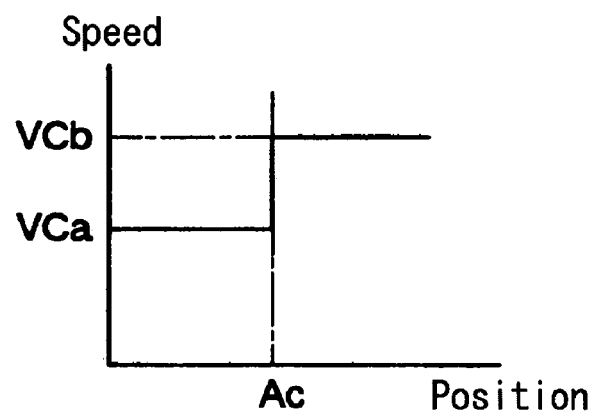
FIG. 21 is a graph indicating a relation between operating speed VCa and VCb of the seat cushion and a position of the seat cushion in the storing operation speed control b.
Figure 22:
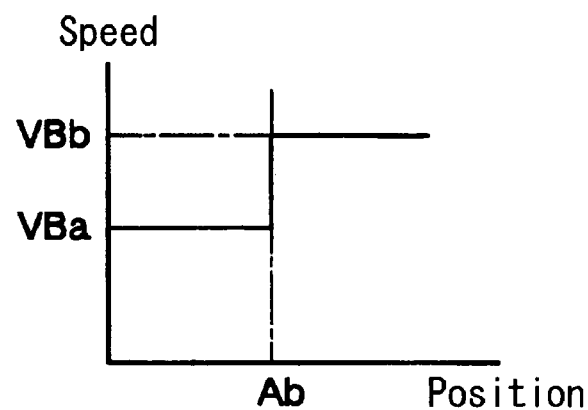
FIG. 22 is a graph indicating a relation between operating speed VBa and VBb of a seatback and a position of the seatback in the storing operation speed control b.

A storing operation speed control b will be explained hereinafter with reference to FIGS. 20-22. As illustrated in FIG. 20, the entire operating time is reduced in the storing operation speed control b by temporally overlapping the operation of the seatback 3 and the seat cushion 2. In the storing operation speed control b, the operation state of the operating switch 100 is read in step S2. If the operating switch 100 is turned on to operate the seat cushion 2 and the seatback 3 in the storing operation, the storing operation of the seat cushion 2 is started in step S4. Then, the position of the seat cushion 2 is determined if the present position of the seat cushion 2 reaches the intermediate position Ac in step S6. The intermediate position Ac is set so that the interference of the seat apparatus 1 with the other components of the vehicle is not generated even when the operating speed of the seat cushion 2 is increased. The intermediate position Ac is memorized in the memory of the ECU 600. If the present position of the seat cushion 2 is not reached to the intermediate position Ac (step S6: NO), because of the possibility of the interference of the seat apparatus 1 with the other components of the vehicle, the operating speed of the seat cushion 2 is set at VCa in step S8. The operating speed VCa is relatively slower than the operating speed VCb and the interference of the seat apparatus 1 with the other components of the vehicle can thereby be avoided. In contrast, when the present position of the seat cushion 2 reaches the intermediate position Ac (step S6: YES), because the possibility of the interference of the seat apparatus 1 with the other components of the vehicle can be avoided, the operating speed of the seat cushion 2 is set at VCb (VCb is relatively faster than VCa) in step S10. Accordingly, the entire operating time can be reduced. Further, the storing operation of the seatback 3 is started in step S12 while performing the storing operation of the seat cushion 2. Thereby, the operation of the seat cushion 2 and the operation of the seatback 3 can temporally be overlapped with each other for reducing the entire operating time. Then, the position of the seatback 3 is determined if the present position of the seatback 3 reaches the intermediate position Ab in step S14. The intermediate position Ab is set so that the interference of the seat apparatus 1 with the other components of the vehicle is avoided even when the operating speed of the seatback 3 is increased. The intermediate position Ab is memorized in the memory of the ECU 600. If the present position of the seatback 3 is not reached to the intermediate position Ab (step S14: NO), because the stand angle of the seatback 3 is large, an operating speed of the seatback 3 is set at VBa (VBa is relatively slower than VBb) for preventing the interference of the seat apparatus 1 with the other components of the vehicle. In contrast, when the present position of the seatback 3 reaches the intermediate position Ab (step S14: YES), because the possibility of the interference of the seat apparatus 1 with the other components of the vehicle is avoided due to the small stand angle of the seatback 3, the operating speed of the seatback 3 is set at VBb (VBb is relatively faster than VBa) for reducing the movement time. Then, the completion of the storing operation of the seat apparatus 1 is determined in step S20. If at least one of the operations is not completed (step S20: NO), the procedure returns to step S2 to continue the at least one of the operations, which is not completed. In contrast, if the storing operation of the seat apparatus 1 is completed (step S20: YES), the storing operation of the seat apparatus 1 is terminated. The step S6 severs as the position determining means for determining if the moved position of the seat cushion 2 reaches the predetermined position on the basis of the physical quantity regarding the seat cushion 2 detected by means of the physical quantity detecting means. Further, the step S10 serves as the speed change command means which outputs the command for changing (increasing) the operating speed of the seat cushion 2 from the initial operating speed.

Moreover, in the storing operation speed control b, the step S14 serves as a position determining means for determining if a moved position of the seatback 3 reaches a predetermined position on the basis of the physical quantity regarding the seatback 3 detected by means of the physical quantity detecting means. The step S18 serves as a speed change command means which outputs a command for changing (increasing) the operating speed of the seatback 3 from an initial operating speed. As illustrated in FIG. 21, the operating speed of the seat cushion 2 increases in the later operation period relative to the early operation period in the storing operation speed control b. Further, as illustrated in FIG. 22, the operating speed of the seatback 3 increases in the later operation period relative to the early operation period in the storing operation speed control b. According to the embodiment of the present invention, because the operating speed of the seat cushion 2 increases in the course of the operation as well as the operating speed of the seatback 3 increases in the course of the operation, the entire operating time can further be reduced without causing the interference of the seat apparatus 1 with the other components of the vehicle. In the storing operation speed control b according to the embodiment of the present invention, the operation of the seat cushion 2 and the operation of the seatback 3 are started at about the same time.

However, the present invention is not limited thereto. Alternatively, or in addition, the operation starting time of the seatback 3 and the operation starting time of the seat cushion 2 may be set at different times in a condition where the operation of the seat cushion 2 and the operation of the operation of the seatback 3 are temporally overlapped.

(Storing Operation Speed Control c)

Figure 23:
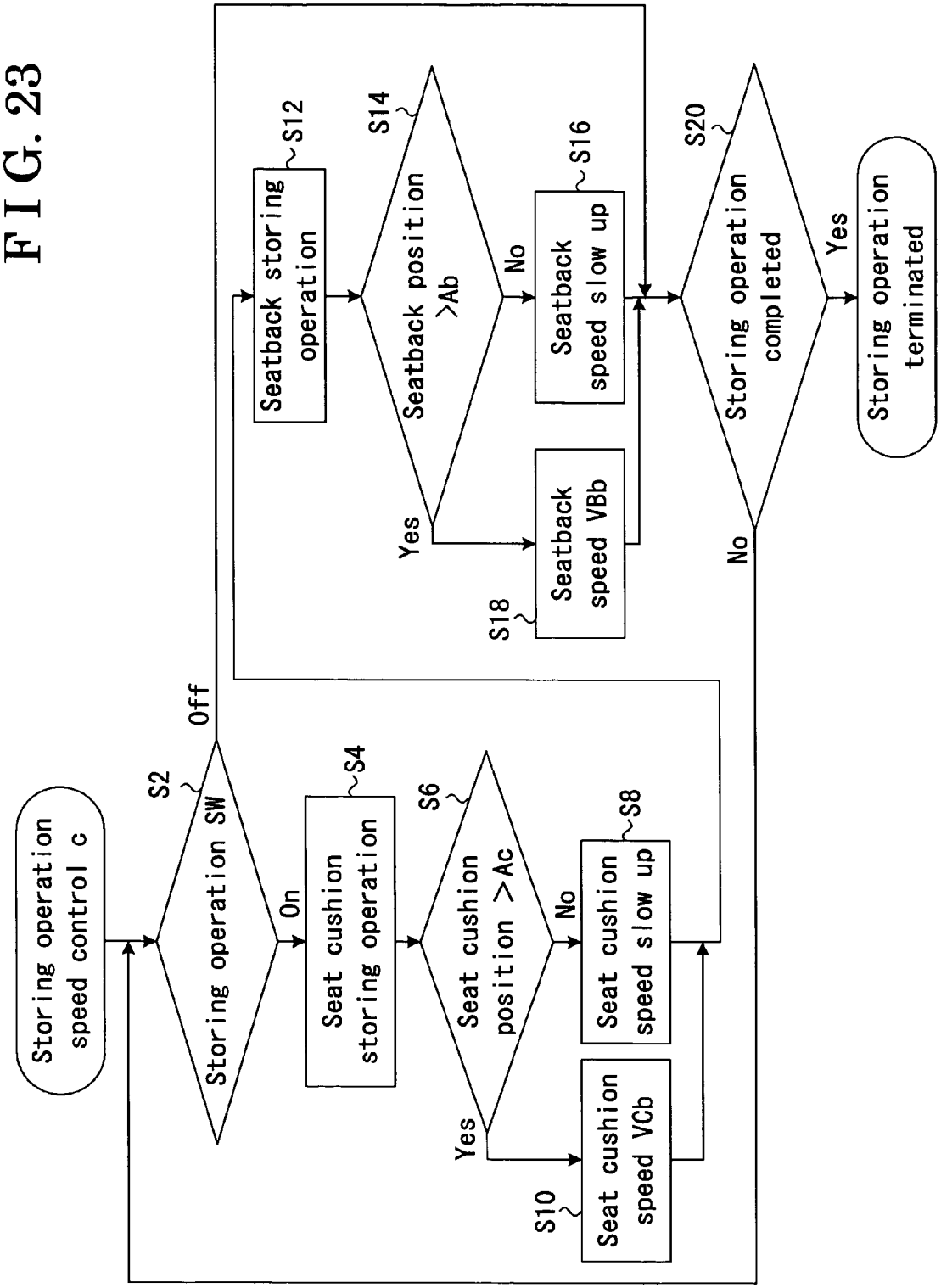
FIG. 23 is a flow chart illustrating a storing operation speed control c.
Figure 24:
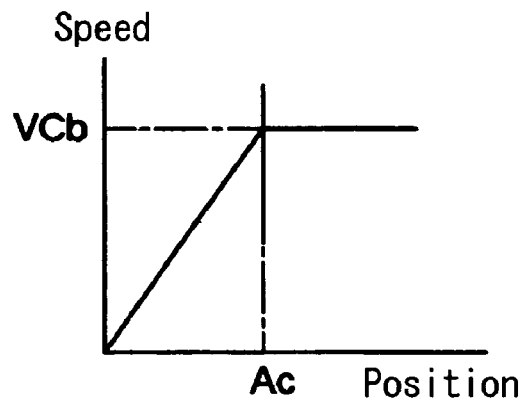
FIG. 24 is a graph indicating a relation between an operating speed VCb of the seat cushion and a position of the seat cushion in the storing operation speed control c.
Figure 25:
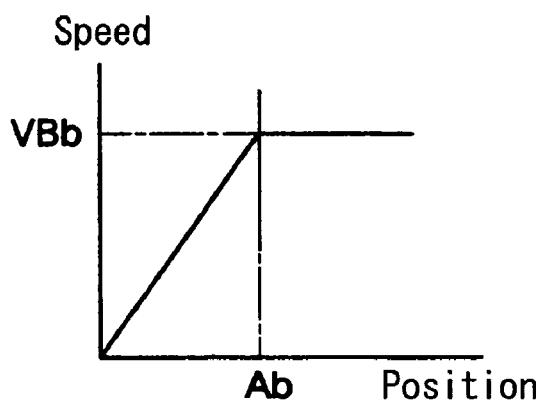
FIG. 25 is a graph indicating a relation between an operating speed VBb of the seatback and a position of the seatback in the storing operation speed control c.

A storing operation speed control c will be explained hereinafter with reference to FIGS. 23-25. In step S6, the position of the seat cushion 2 is determined if the present position of the seat cushion 2 reaches the intermediate position Ac. If the present position of the seat cushion 2 is not reached to the intermediate position Ac (step S6: NO), the seat cushion 2 slows up by gradually increasing the operating speed. The intermediate position Ac is set so that the interference of the seat apparatus 1 with the other components of the vehicle is not generated even when the operating speed of the seat cushion 2 is increased. The intermediate position Ac is memorized in the memory of the ECU 600. In contrast, when the present position of the seat cushion 2 reaches the intermediate position Ac (step S10: YES), because the possibility of the interference of the seat apparatus 1 with the other components of the vehicle is avoided, the operating speed of the seat cushion 2 is set at VCb (VCb is relatively fast) for reducing the entire operating time. Further, if the present position of the seatback 3 is not reached to the intermediate position Ab (step S14: NO), the seatback 3 slows up by gradually increasing the operating speed. The intermediate position Ab is set so that the interference of the seat apparatus 1 with the other components of the vehicle is not generated even when the operating speed of the seatback 3 is increased. The intermediate position Ab is memorized in the memory of the ECU 600. In contrast, if the present position of the seatback 3 reaches the intermediate position Ab (step S14: YES), because the possibility of the interference of the seat apparatus with the other components of the vehicle is avoided, the operating speed of the seatback 3 is set at VBb (VBb is relatively fast) for reducing the entire operation time. As illustrated in FIG. 24, the operating speed of the seat cushion 2 gradually increases in the early operation period and the operating speed in the later operation period becomes relatively faster than the early operation period in the storing operation speed control c. Further, as illustrated in FIG. 25, the operating speed of the seatback 3 gradually increases in the early operation period and the operating speed in the later operation period becomes relatively faster than the early operation period in the storing operation speed control c. Accordingly, the entire operating time can be reduced without causing the interference of the seat apparatus 1 with the other components of the vehicle. In the storing operation speed control c according to the embodiment of the present invention, the operation of the seat cushion 2 and the operation of the seatback 3 are started at about the same time. However, the present invention is not limited thereto. Alternatively, or in addition, the operation starting time of the seatback 3 and the operation starting time of the seat cushion 2 may be set at different times in a condition where the operation of the seat cushion 2 and the operation of the seatback 3 are temporally overlapped.

(Returning Operation Speed Control a)

Figure 26:
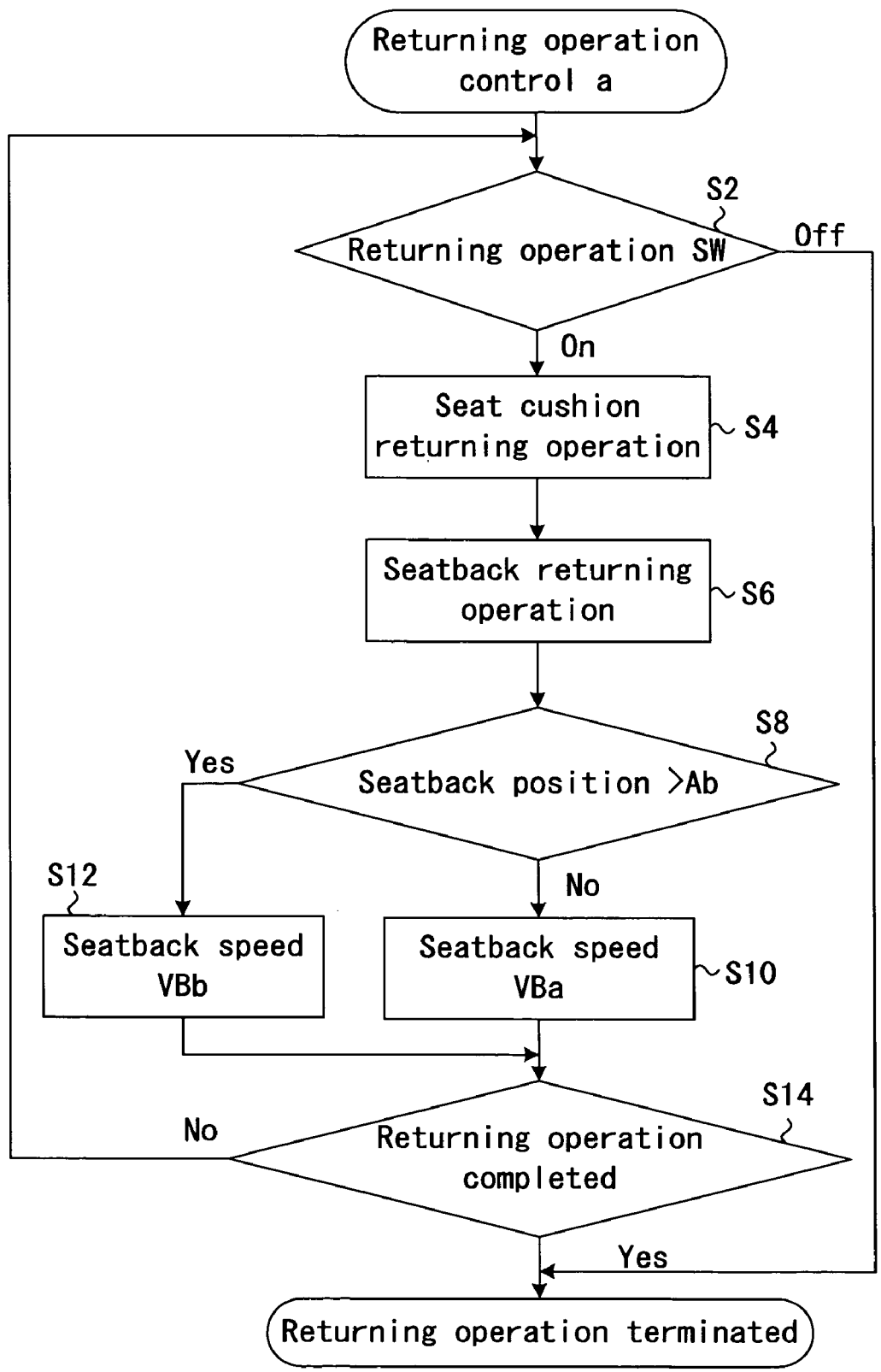
Figure 27:
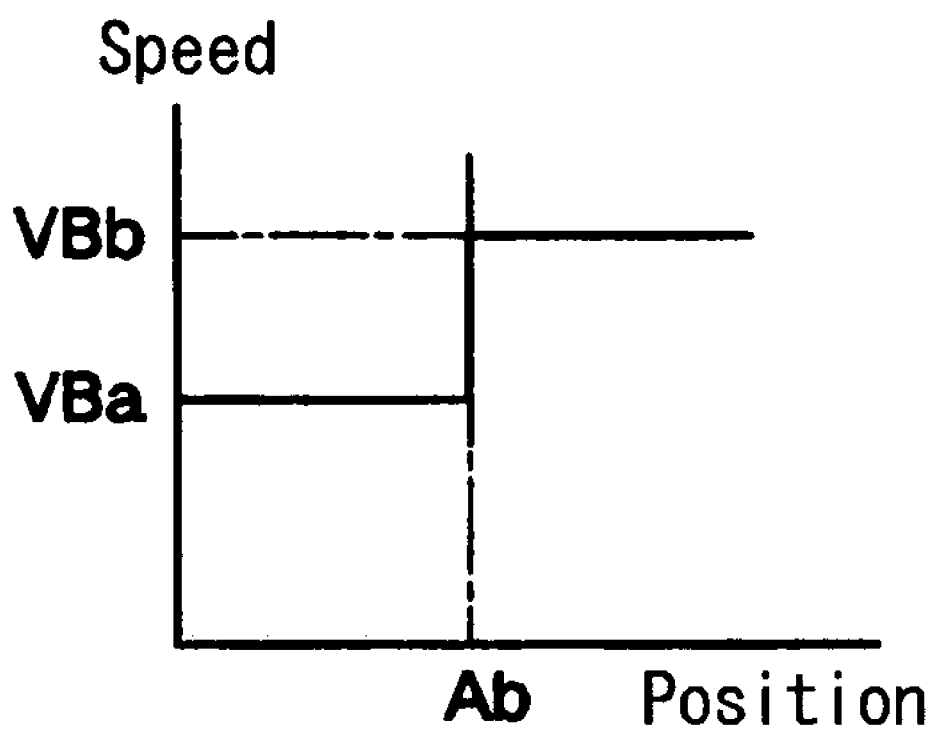

A returning operation speed control a will be explained hereinafter with reference to FIGS. 26 and 27. In the returning operation speed control a, the operation state of the operating switch 100 is read in step S2. If the operating switch 100 is turned on to operate the seat cushion 2 and the seatback 3 in the returning operation, the returning operation of the seat cushion 2 is started in step S4 and the returning operation of the seatback 3 is started in step S6. The returning operation of the seatback 3 and the returning operation of the seat cushion 2 are performed at about the same time. Then, the position of the seatback 3 is determined if the present position of the seatback 3 reaches the intermediate position Ab in step S8. The intermediate position Ab is set so that the interference of the seat apparatus 1 with the other components of the vehicle is not generated even when an operating speed of the seatback 3 is increased. The intermediate position Ab is memorized in the memory of the ECU 600. If the present position of the seatback 3 is not reached to the intermediate position Ab (step S8: NO), because of the possibility of the interference of the seat apparatus 1 with the other components of the vehicle, the operating speed of the seatback 3 is set at VBa. The operating speed VBa is relatively slower than an operating speed VBb and the interference of the seat apparatus 1 with the other components of the vehicle can thereby be avoided. In contrast, if the present position of the seatback 3 reaches the intermediate position Ab (step S8: YES), because the possibility of the interference of the seat apparatus 1 with the other components of the vehicle is avoided, the operating speed of the seatback 3 is set at VBb (VBb is relatively faster than VBa). Accordingly, the entire operating time can be reduced. Then, the completion of the returning operation of the seat apparatus 1 is determined in step 14. If at least one of the returning operations is not completed (step S14: NO), the procedure returns to step S2 to continue the at least one of the operations, which is not completed. In contrast, if all the returning operations are completed (step S14: YES), the returning operation of the seat apparatus 1 is terminated. As illustrated in FIG. 27, the operating speed of the setback 3 is relatively low in the early operation period and is relatively high in the later operation period in the returning operation speed control a. Accordingly, the entire operating time can be reduced. The step S8 severs as the position determining means for determining if the moved position of the seatback 3 reaches the predetermined position on the basis of the physical quantity regarding the seatback 3 detected by means of the physical quantity detecting means. Further, the step S12 serves as the speed change command means which outputs the command for changing (increasing) the operating speed of the seatback 3 from the initial operating speed. In the returning operation speed control a according to the embodiment of the present invention, the operation of the seat cushion 2 and the operation of the seatback 3 are started at about the same time. However, the present invention is not limited thereto. Alternatively, or in addition, the operation starting time of the seatback 3 and the operation starting time of the seat cushion 2 may be set at different times in a condition where the operation of the seat cushion 2 and the operation of the seatback 3 are temporally overlapped.

(Returning Operation Speed Control b)

Figure 28:
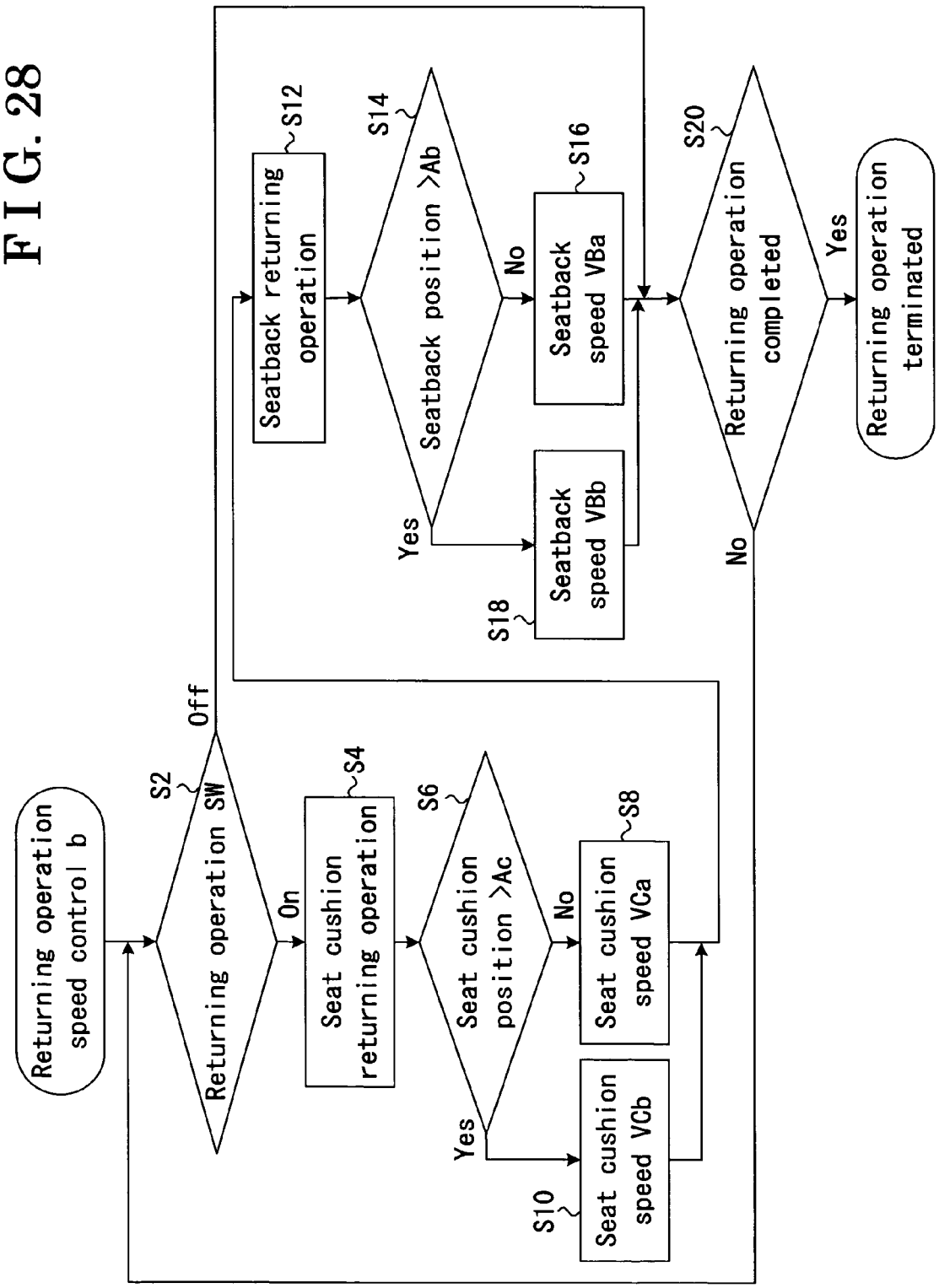
FIG. 28 is a flow chart illustrating a returning operation speed control b.
Figure 29:
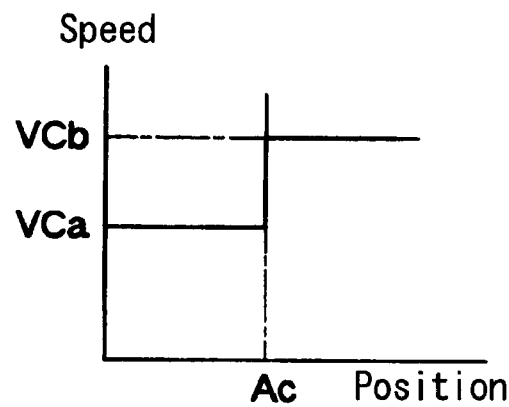
FIG. 29 is a graph indicating a relation between operating speed VCb and VCa of the seat cushion and a position of the seat cushion in the returning operation speed control b.
Figure 30:
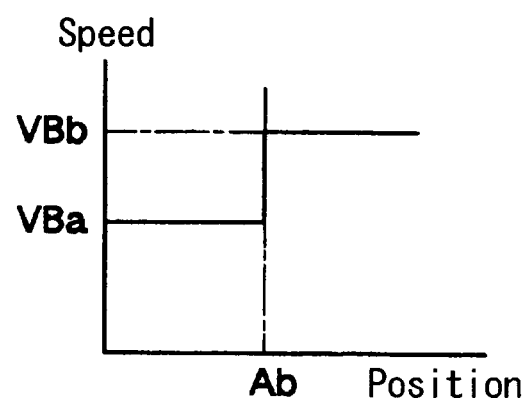
FIG. 30 is a graph indicating a relation between moving speed VBb and VBa of the seatback and a position of the seatback in the returning operation speed control b.

A returning operation speed control b will be explained hereinafter with reference to FIGS. 28-30. In the returning operation speed control b, the operation state of the operating switch 100 is read in step S2. If the operating switch 100 is turned on to operate the seat cushion 2 and the seatback 3 in the returning operation, the returning operation of the seat cushion 2 is started in step S4. Then, the position of the seat cushion 2 is determined if the present position of the seat cushion 2 reaches the intermediate position Ac in step 6. The intermediate position Ac is set so that the interference of the seat apparatus 1 with the other components of the vehicle is not generated even when the operating speed of the seat cushion 2 is increased. The intermediate position Ac is memorized in the memory of the ECU 600 with respect to each type of vehicle. If the present position of the seat cushion 2 is not reached to the intermediate position Ac (step S6: NO), the operating speed of the seat cushion 2 is set at VCa (VCa is relatively slower than VCb) for avoiding the interference of the seat apparatus 1 with the other components of the vehicle. In contrast, if the present position of the seat cushion 2 reaches the intermediate position Ac (step S6: YES), because the possibility of the interference of the seat apparatus 1 with the other components of the vehicle is avoided, the operating speed of the seat cushion 2 is set at VCb (VCb is relatively faster then VCa). Accordingly, the entire operating time can be reduced. Further, the returning operation of the seatback 3 is started in step 12. Then, the position of the seatback 3 is determined if the present position of the seatback 3 reaches the intermediate position Ab in step S14. The intermediate position Ab is preliminarily set. If the present position of the seatback 3 is not reached to the intermediate position Ab (step S14: NO), the operating speed of the seatback 3 is set at VBa (VBa is relatively slower than VBb) for avoiding the interference of the seat apparatus 1 with the other components of the vehicle. In contrast, when the present position of the seatback 3 reaches the intermediate position Ab (step S14: YES), because the possibility of the interference of the seat apparatus 1 with the other components of the vehicle is avoided, the operating speed of the seatback 3 is set at VBb (VBb is relatively faster than VBa) for reducing the entire operating time. Then, the completion of the returning operation of the seat apparatus 1 is determined in step S20. If at least one of the returning operations is not completed (step S20: NO), the procedure returns to step S2 to continue the at least one of the returning operations, which is not completed. In contrast, if all the returning operations are completed (step S20: YES), the returning operation of the seat apparatus 1 is terminated. The step S6 severs as the position determining means for determining if the moved position of the seat cushion 2 reaches the predetermined position on the basis of the physical quantity regarding the seat cushion 2 detected by means of the physical quantity detecting means. Further, the step S10 serves as the speed change command means which outputs the command for changing (increasing) the operating speed of the seat cushion 2 from the initial operating speed. The step S14 severs as the position determining means for determining if the moved position of the seatback 3 reaches the predetermined position on the basis of the physical quantity regarding the seatback 3 detected by means of the physical quantity detecting means. Further, the step S18 serves as the speed change command means which outputs the command for changing (increasing) the operating speed of the seatback 3 from the initial operating speed. In the returning operation speed control b according to the embodiment of the present invention, the operation of the seat cushion 2 and the operation of the seatback 3 are started at about the same time. However, the present invention is not limited thereto. Alternatively, or in addition, the operation starting time of the seat cushion 2 and the operation starting time of the seatback 3 may be set at different times in a condition where the operation of the seat cushion 2 and the operation of the seatback 3 are temporally overlapped.

(Returning Operation Speed Control c)

Figure 31:
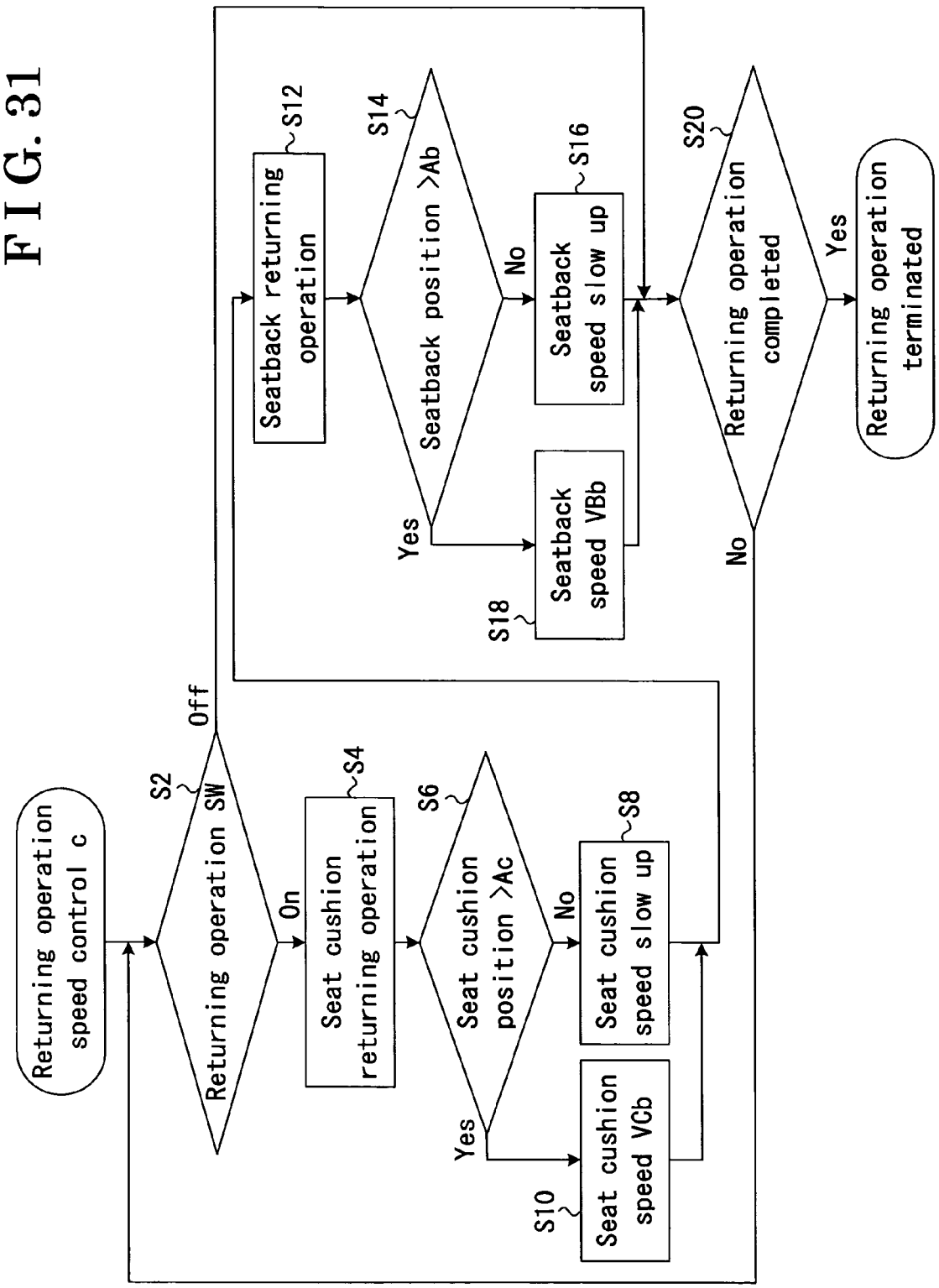
FIG. 31 is a flow chart illustrating a returning operation speed control c.
Figure 32:
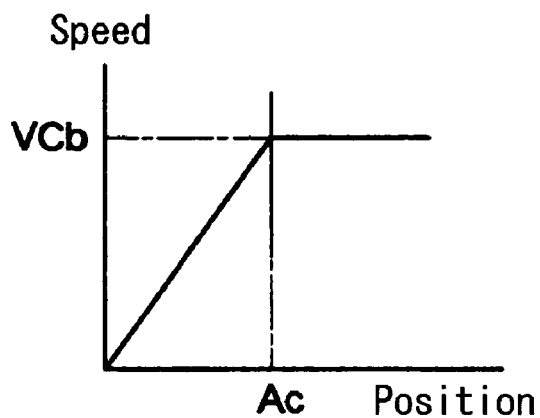
FIG. 32 is a graph indicating a relation between an operating speed VCb of the seat cushion and a position of the seat cushion in the returning operation speed control c.
Figure 33:
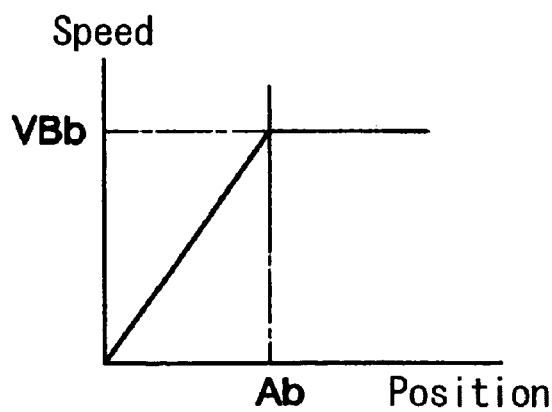
FIG. 33 is a graph indicating a relation between an operating speed VBb of the seatback and a position of the seatback in the returning operation speed control c.

A returning operation speed control c will be explained hereinafter with reference to FIGS. 31-33. A flow chart of the returning operation speed control c illustrated in FIG. 31 is basically similar to that of the returning operation speed control b illustrated in FIG. 28. However, in the returning operation speed control c, the position of the seat cushion 2 is determined if the present position of the seat cushion 2 reaches the intermediate position Ac in step S6. If the present position of the seat cushion 2 is not reached to the intermediate position Ac (step S6: NO), the seat cushion 2 slows up by gradually increasing the operating speed in step S8. In contrast, if the present position of the seat cushion 2 reaches the intermediate position Ac (step S6: YES), because the possibility of the interference of the seat apparatus 1 with the other components of the vehicle is avoided, the operating speed of the seat cushion 2 is set at VCb (VCb is relatively fast) for reducing the entire operating time. Further, if the present position of the seatback 3 is not reached to the intermediate position Ab (step S14: NO), the seatback 3 slows up by gradually increasing the operating speed of the seatback 3 in step S16. In contrast, if the present position of the seatback 3 reaches the intermediate position Ab (step S14: YES), because the possibility of the interference of the seat apparatus 1 with the other components of the vehicle is avoided, the operating speed of the seatback 3 is set at VBb (VBb is relatively fast) in step S18 for reducing the entire operating time. As illustrated in FIGS. 32 and 33, the operating speed of the seat cushion 2 and the seatback 3 is relatively low in the early operation period and is relatively high in the later operation period. Accordingly, the entire operating time can be reduced without causing the interference of the seat apparatus 1 with the other components of the vehicle. In the returning operation speed control c according to the embodiment of the present invention, the operation of the seat cushion 2 and the operation of the seatback 3 are started at about the same time. However, the present invention is not limited thereto. Alternatively, or in addition, the operation starting time of the seat cushion 2 and the operation starting time the seatback 3 may be set at different times in a condition where operation of the seat cushion 2 and the operation of the seatback 3 are temporally overlapped.

Features of the embodiment of the present invention will additionally be explained hereinafter with reference to FIGS. 5, 34, and 35. The seatback operating switch 102 for performing a reclining operation is provided at a position where the operator seated on the seat cushion 2 at the seating position P1 can operate the switch. When the operator seated on the seat cushion 2 manually operates the seatback operating switch 102 while seating on the seat cushion, the seatback 3 can be inclined rearward (the direction of the arrow R) and forward (the direction of the arrow F) in response to an operating amount so that the operator can obtain comfortable sense of use. The reclining operation is performed within the fine adjustable range θA (i.e., the reclining range). The seatback 3 is set such that the seatback 3 can be inclined only within the fine adjustable range θA (i.e., the reclining range) in a condition where the operator seated on the seat apparatus 1 operates the seatback operating switch 102. More specifically, the fine adjustment prohibited range θB is set for limiting the excessive forward (the direction of the arrow F) inclination of the seatback 3 when the operator seated on the seat apparatus 1 operates the seatback operating switch 102. Accordingly, when the operator seated on the seat apparatus 1 operates the seatback operating switch 102, the inclination of the seatback 3 into the fine adjustment prohibited range θB is prohibited for preventing the operator from being applied with the excessive load from the seatback 3. The fine adjustment prohibited range θB represents an excessive load restricting range for restricting the excessive load from the seatback 3 relative to the operator seated on the seat cushion 2. In other words, because the seatback 3 is foldable relative to the seat cushion 2 so as to be served as the table, the stand angle θ of the seatback 3 is excessively reduced when the seatback operating switch 102 is operated in the direction in which the seatback 3 inclines forward (the direction of the arrow F) and the operator seated on the seat cushion 2 may be applied with the excessive load because of the pressure from the seatback 3. In this regard, according to the embodiment of the present invention, the ECU 600 prohibits a forward inclination of the seatback 3 even when the operator seated on the seat cushion 2 operates the seatback operating switch 102 in a direction in which the stand angle θ is reduced, i.e., forward (the direction of the arrow F). In consequence, in a condition where the operator is seated on the seat cushion 2, the application of the excessive load from the seatback 3 relative to the operator seated on the seat cushion 2 can be prevented and the safety of the seat apparatus can be improved.

Figure 34:
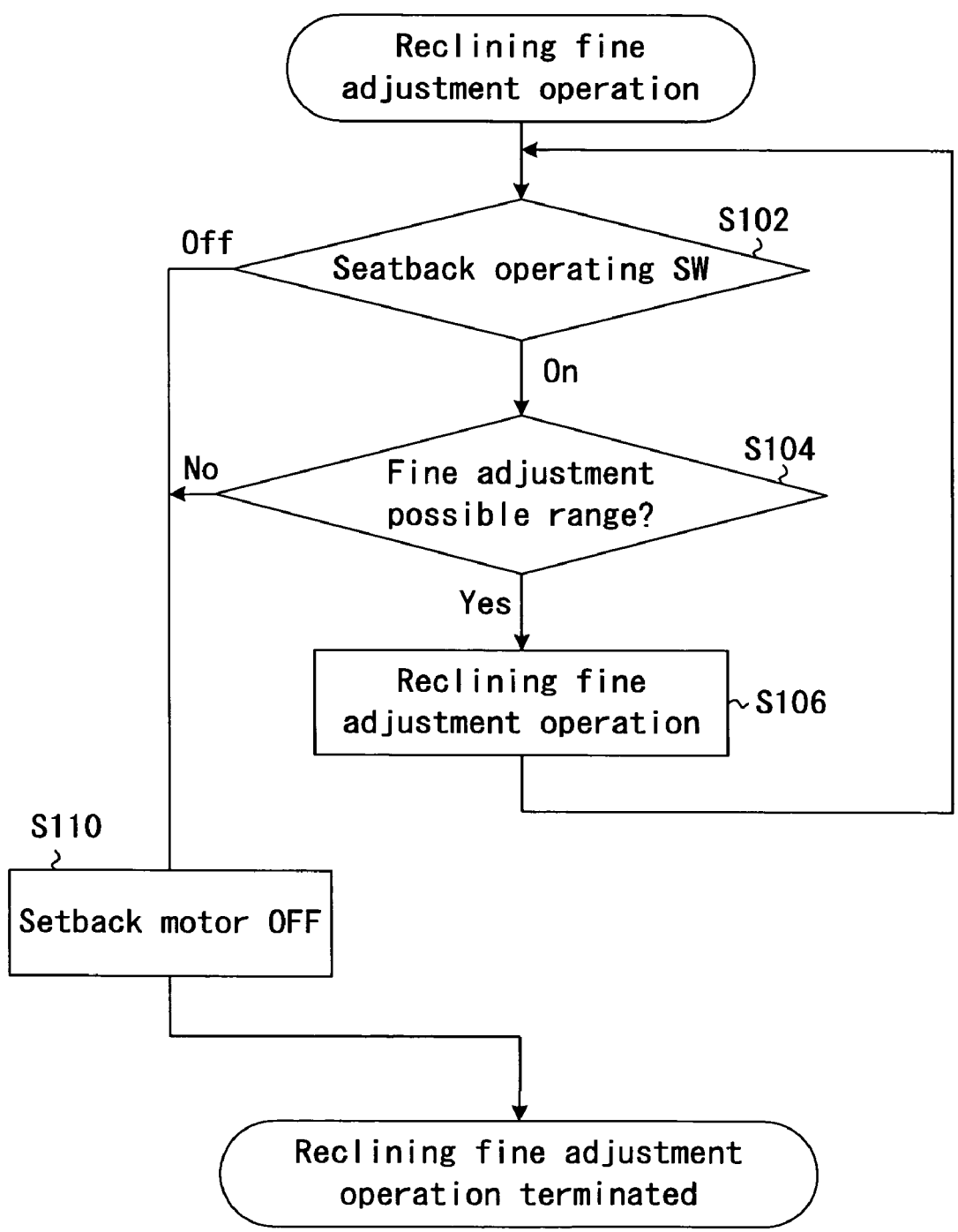
FIG. 34 is a flow chart illustrating a reclining fine adjustment operation.

As illustrated in FIG. 34, an operation state of the seatback operating switch 102 is read in step S102. If the seatback operating switch 102 is at an OFF state, because the reclining operation is not required, the seatback motor 400 remains at OFF state in step S110. In contrast, if the seatback operating switch 102 is at an ON state, because the reclining operation is required, it is determined if the present position of the seatback 3 is within the fine adjustable range θA in step S104. If the present position of the seatback 3 is within the fine adjustable range θA (step S104: YES), the stand angle θ of the seatback 3 is fine adjusted by turning on the seatback motor 400 and a reclining fine adjustment operation of the seatback 3 is performed in response to the operating amount of the seatback operating switch 102. Accordingly, as long as the seatback operating switch 102 is manually operated, the reclining fine adjustment operation of the seatback 3 is performed. When the seatback operating switch 102 is turned off, the seatback motor 400 is turned off and the reclining fine adjustment operation of the seatback 3 is stopped. In contrast, if the present position of the seatback 3 is not within the fine adjustable range θA (step S104: NO), the present position of the seatback 3 is within the fine adjustment prohibited range θB. Therefore, the seatback motor 400 is turned off in step S110, and the further forward inclination of the seatback 3 is not performed. More specifically, even when the operator seated on the seat cushion 2 manually operates the seatback operating switch 102, the forward inclination of the seatback 3 is prohibited. Therefore, in a condition where the operator is seated on the seat cushion 2, the application of the excessive load from the seatback 3 relative to the operator can be prevented. Accordingly, troubles of the seatback 3 having the table function can be resolved. The step S104 functions as a range determining means (i.e., a range determining device) for determining if the present position of the seatback 3 is within the excessive load restricting range in which the application of the excessive load relative to the operator seated on the seat cushion 2 is restricted. The step S110 functions as a seatback inclination restricting means (i.e., a seatback inclination restricting device) for restricting the forward inclination of the seatback 3 by limiting the driving of the seatback motor 400 (i.e., the seatback drive device) regardless of the operation of the seatback operating switch 102 when the range determining means determines that the present position of the seatback 3 is within the excessive load restricting range.

According to the embodiment of the present invention, as illustrated in FIG. 5, the automatic operating switch 104 (i.e., a second switch), which operates the seatback motor 400 for inclining the seatback 3 forward (the direction of the arrow F), is provided. The automatic operating switch 104 is provided at a position where the hand of the operator does not reach. For example, the automatic operating switch 104 is provided away from the seating position P1 of the seat apparatus 1. More specifically, because the hand of the operator seated on the seat cushion 2 does not reach the automatic operating switch 104, the operator cannot operate the automatic operating switch 104 as long as the operator is seated on the seat cushion 2. The operator seated on the seat cushion 2 is required to leave the seat cushion 2 and move to the automatic operating switch 104 for operating the switch 104. Accordingly, when the seatback 3 is inclined forward (the direction of the arrow F) by means of the automatic operating switch 104, the operator is not seated on the seat cushion 2. In consequence, the application of the load from the seatback 3 relative to the operator can be restricted even when the seatback 3 is inclined forward and comes to a table position by means of the operation of the automatic operating switch 104. According to the embodiment of the present invention, when the automatic operating switch 104 is operated, the seatback 3 overlaps with the seat cushion 2a and the back surface 3x of the seatback 3 can be served as the table. Accordingly, the table auto operation is performed. On this occasion, because the back surface 3x of the seatback 3 folded on the seat cushion 2 can be served as the table, a use value of the seatback can be increased besides the reclining.

Figure 35:
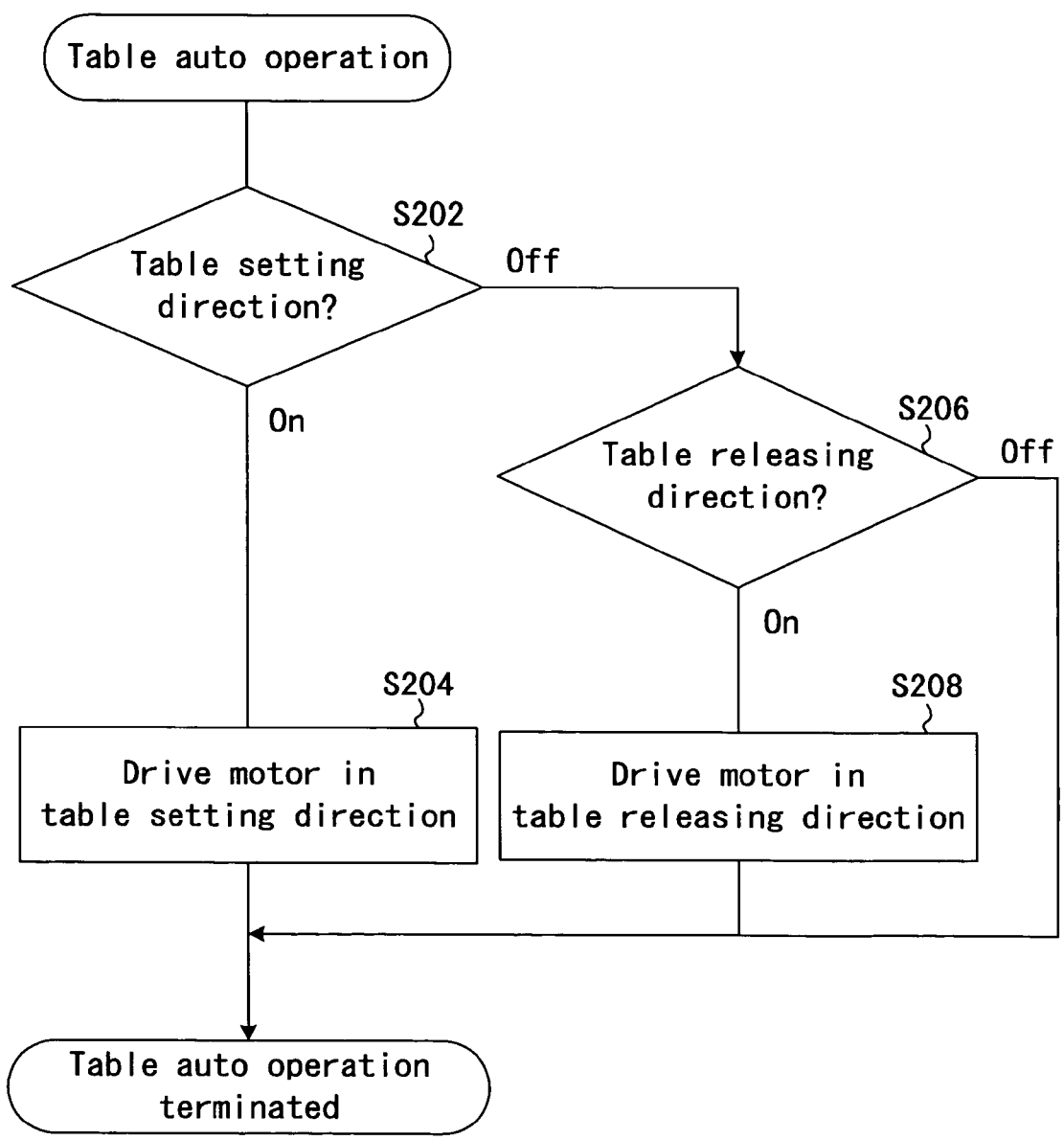
FIG. 35 is a flow chart illustrating a table auto operation

As illustrated in FIG. 35, an operation state of the automatic operating switch 104 is read for determining if the automatic operating switch 104 is turned on in a table setting direction, in step S202. If the automatic operating switch 104 is turned on in the table setting direction, the seatback 3 is inclined forward (the direction of the arrow F) by driving the seatback motor 400 in a first direction (the table setting direction), the stand angle of the seatback 3 is reduced, and the seatback 3 is finally lay on the upper surface of the seat cushion 2 in step S204. On this occasion, because a flatness of the back surface 3x of the seatback 3 is increased, the seatback 3 can be served as the table. Further, if the automatic operating switch 104 is turned off in the table setting direction, it is determined if the automatic operating switch 104 is turned on in a table releasing direction in step S206. If the automatic operating switch 104 is turned on in the table releasing direction, the seatback 3 is moved backward (the direction of the arrow R) by reversely driving the seatback motor 400, the stand angle of the seatback 3 is increased, and the seatback 3 comes to the stand position in step S208. On this occasion, because the stand angle of the seatback 3 is large, the operator can be seated on the seat cushion 2. According to the embodiment of the present invention, the automatic operating switch 104 does not require a continuous manual operation. The automatic operating switch 104 can incline the seatback 3 forward and rearward by means of a fingertip operation (a single operation). Accordingly, by means of the fingertip operation of the automatic operating switch 104, the seatback 3 can be inclined forward (the direction of the arrow F) and can automatically come to the table position. Further, the seatback 3 can be moved rearward and the table function can automatically be released. Accordingly the automatic operating switch 104 is not required to continuously be pushed and an operationality of the operator can be improved. Alternatively, or in addition, the automatic operating switch 104 may adopt a system of requiring a continuous manual operation.

The aforementioned embodiment of the present invention is applied to the seat apparatus placed at the rear side of the vehicle. However, the present invention is not limited thereto. Alternatively, or in addition, the present invention may be applied to a seat apparatus placed at the front side of the vehicle. Further, the embodiment of the present invention is applied to the seat apparatus of the vehicle. However, the present invention is not limited thereto. Alternatively or in addition, the present invention may be applied to any seat apparatus of variety of use. According to the embodiment of the present invention, the seating position P1 is placed at the relatively front side of the floor 4 and the storage position P2 is placed at the relatively rear side of the floor 4. Alternatively, or in addition, an arrangement of the seating position P1 and the storage position P2 can be reversed. Further, the system of changing the position of the seat apparatus 1 between the seating position P1 and the storage position P2 is not limited to the structures illustrated in FIGS. 1-5. Alternatively, or in addition, the system of vertically flipping the seatback 3 may be applicable. According to the embodiment of the present invention, the link devices for moving the seat cushion 2 is provided. However, the present invention is not limited thereto. Alternatively or in addition, other mechanisms such as a gear mechanism may be applicable for moving the seat cushion 2.

The present invention can be applied to a seat apparatus capable of changing its position between the seating position and the storage position, which is used for the vehicle, aircraft, ship, household purpose, institutional purpose, or the like.

According to the embodiment of the present invention, the control unit is provided for controlling the seatback drive device by means of the seatback operating switch. The control unit includes the range determining means for determining if the preset position of the seatback is within the excessive load restricting range, in which the application of the excessive load relative to the operator is restricted, and includes the seatback inclination restricting means for restricting the forward inclination of the seatback by limiting the driving of the seatback drive device regardless of the operation of the seatback operating switch when the range determining means determines that the present position of the seatback is within the excessive load restricting range. On this occasion, the seatback operating switch can be served as a reclining switch which performs the reclining operation by means of a backward inclination of the seatback. The second switch is provided for operating the seatback drive device to perform the forward inclination of the seatback. The second switch can be a manual type. The second switch can be operated independently from the seatback operating switch. According to the embodiment of the present invention, the second switch is provided at the position in which the hand of the operator seated on the seat cushion does not reach. For example, the second switch is provided away from the seating position of the seat apparatus. More specifically, because the hand of the operator seated on the seat cushion does not reach the second switch, the operator cannot operate the second switch. The operator seated on the seat cushion is required to leave the seat cushion and move to the second switch for operating the second switch. Accordingly, when the seatback is inclined by means of the second switch, the operator has left the seat apparatus and is not seated on the seat cushion. In consequence, the application of the load from the seatback relative to the operator can be restricted even when the seatback is excessively inclined forward. For example, an opening/closing door is provided at a position where the hand of the operator seated on the seat cushion does not reach and the second switch is provided at the opening/closing door. According to the embodiment of the present invention, the back surface of the seatback can be served as the table by overlapping the seatback with the seat cushion. On this occasion, the seatback come into a substantial horizontal state and can be served as the table. Accordingly, the use value of the seatback can be improved.

According to the embodiment of the present invention, the second switch operates the seatback drive device for inclining the seatback forward and rearward without requiring the continuous manual operation. Therefore, the second switch can operate the seatback drive device for inclining the seatback forward and rearward by means of the single operation. Because the second switch can be operated by means of the single operation, it is convenient to perform the table function by inclining the seatback forward and to release the table function by moving the seatback rearward. Further, the second switch is not required to continuously be operated and the user-friendliness can be improved.

According to the embodiment of the present invention, the position of the seat cushion and the seatback is changed between the seating position and the storage position. The seat drive device is provided for operating the seat cushion and the seatback between the seating position and the storage position. The seat drive device further includes the seat cushion drive device. The seatback drive device and the seat cushion drive device can be operated independently from each other. In the storage position, the seat cushion and the seatback are stored in a condition where the angle of the seatback relative to the seat cushion is at the smaller degree. According to the embodiment of the present invention, when the seat cushion and the seatback are moved between the seating position and the storage position, the control unit temporally overlaps the operation time of the seat cushion and the operation time of the seatback. Accordingly, the entire operation time can be reduced. Further, in order to restrict the interference of the seat apparatus with the other components of the vehicle, the operation starting time of the seat cushion and the operating starting time of the seatback can be set at different times. According to the embodiment of the present invention, in the course of the movement of the seat cushion and the seatback between the seating position and the storage position, the control unit changes (increases or reduces) the operation speed of at least one of the seat cushion and the seatback from the initial speed in the direction in which the interference of at least one of the seat cushion and the seatback is restricted. The control unit differs the operation starting time of the seat cushion and the operation starting time of the seatback and overlaps the operation time of the seat cushion and the operation time of the seatback. Accordingly, the interference of at least one of the seat cushion and the seatback can advantageously be restricted. If the interference is generated, the operation speed of at least one of the seat cushion and the seatback can appropriately be increased or reduced. For example, if there is no possibility of the interference, the operation speed can be increased. In contrast, if there is the possibility of the interference, the operation speed can be reduced.

According to the embodiment of the present invention, the seatback operating switch is provided at the position where the operator seated on the seat cushion can operate the switch. Therefore, when the operator seated on the seat cushion operates the seatback operating switch, the reclining operation is performed by moving the seatback rearward. Accordingly, the operator can obtain a comfortable sense of use. However, when the seatback operating switch is operated in the direction in which the seatback is inclined forward, the operator seated on the seat cushion is applied with the pressure from the seatback and the operator may be applied with the excessive load from the seatback. In this regard, according to the embodiment of the present invention, even when the seatback operating switch is operated, an excessive load restricting means (i.e., an excessive load restricting device) restricts the forward inclination of the seatback. In consequence, the application of the excessive load from the seatback relative to the operator seated on the seat cushion can be restricted.

According to the embodiment of the present invention, even when the seatback operating switch is operated, the forward inclination of the seatback is restricted. In consequence, the application of the excessive load from the seatback relative to the operator seated on the seat cushion can be restricted.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus comprising:
a seat cushion on which an operator is to be seated;
a seatback movably inclinable relative to the seat cushion to incline in a forward direction relative to the seat cushion to reduce an angle of the seatback relative to the seat cushion and to incline in a rearward direction relative to the seat cushion to increase the angle of the seatback relative to the seat cushion;
a seatback drive device operatively connected to the seatback to incline the seatback in the forward and rearward directions relative to the seat cushion;
a seatback operating switch operable by the operator seated on the seat cushion, the seatback driving device being operated in response to operation of the seatback operating switch to incline the seatback in the forward direction relative to the seat cushion; and
excessive load restricting means for restricting application of an excessive load to the operator seated on the seat cushion by determining whether the angle of the seatback relative to the seat cushion is within an adjustment permitting range and by preventing inclination of the seatback in the forward direction, even when the seatback operating switch is operated, if the angle of the seatback relative to the seat cushion is outside the adjustment permitting range.

2. The seat apparatus according to claim 1, wherein the seatback operating switch also serves as a reclining switch performing a reclining operation by inclining the seatback in the rearward direction.

3. The seat apparatus according to claim 1, further comprising a second switch positioned at a location incapable of being operated by the operator seated on the seat cushion, the second switch being operable to movably incline the seatback in the forward direction.

4. The seat apparatus according to claim 3, wherein the second switch operates the seatback to incline the seatback in the forward direction into a position at which the seatback overlaps the seat cushion.

* * * * *